(12) United States Patent
Krasnov

(10) Patent No.: US 6,198,762 B1
(45) Date of Patent: *Mar. 6, 2001

(54) SUPERSONIC AND SUBSONIC LASER WITH RF DISCHARGE EXCITATION

(75) Inventor: Alexander V. Krasnov, Bryan, OH (US)

(73) Assignee: Yuri Krasnov, Fort Wayne, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/043,438
(22) PCT Filed: Sep. 26, 1996
(86) PCT No.: PCT/US96/15400
§ 371 Date: Jun. 8, 1998
§ 102(e) Date: Jun. 8, 1998
(87) PCT Pub. No.: WO97/12430
PCT Pub. Date: Apr. 3, 1997

(51) Int. Cl.[7] .................................................. H01S 3/097
(52) U.S. Cl. ................................. 372/87; 372/55; 372/82; 372/81
(58) Field of Search ............................... 372/87, 55, 81, 372/58, 94, 82, 83

(56) References Cited

U.S. PATENT DOCUMENTS

| Re. 29,103 | 1/1977 | Wilson et al. . |
|---|---|---|
| 2,226,392 | 12/1940 | Messerschmitt et al. . |
| 3,543,179 | 11/1970 | Wilson . |
| 3,621,461 | 11/1971 | Cason et al. . |
| 3,681,710 | 8/1972 | Lary et al. . |
| 3,748,594 | 7/1973 | Pugh . |
| 3,998,393 | 12/1976 | Petty . |
| 4,064,465 | 12/1977 | Hundstad . |
| 4,100,507 | 7/1978 | Born et al. . |
| 4,194,169 | 3/1980 | Rich et al. . |
| 4,200,819 | 4/1980 | Haslund . |
| 4,206,429 | 6/1980 | Pinsley . |
| 4,251,781 | 2/1981 | Sutter . |
| 4,457,000 | 6/1984 | Rao . |
| 4,598,406 | 7/1986 | Fina et al. . |
| 4,686,681 | 8/1987 | Paranto et al. . |
| 4,805,182 | 2/1989 | Laakmann . |
| 4,837,772 | 6/1989 | Laakmann . |
| 4,841,537 | 6/1989 | Alexander et al. . |
| 4,885,754 | 12/1989 | Egawa . |

(List continued on next page.)

Primary Examiner—Teresa M. Arroyo
Assistant Examiner—Gioacchino Inzirillo
(74) Attorney, Agent, or Firm—John F. Salazar; Middleton Reutlinger

(57) ABSTRACT

Disclosed is a gas laser utilizing radio frequency discharge excitation in the area of sonic or supersonic/subsonic transfer gas flow. The laser uses various types of gases and mixtures of gases as the active medium and provides for RF or UV pre-ionization of the gaseous medium before using radio frequency discharge excitation. The gas is supplied into a receiver, and has downstream therefrom a supersonic nozzle for acceleration of the active gaseous flow to high subsonic or supersonic speeds in order to provide intensive dynamic cooling of the active gas medium. The gas is excited using radio frequency discharge excitation in the critical area of the supersonic nozzle or downstream therefrom. The radio frequency discharge and excitation can also occur within the optical resonator region which is located within the supersonic area of the nozzle.

The present invention provides compact, efficient and superpowerful continuous, quasi-continuous and pulse laser systems with wavelengths from 2.03 mkm to 10.6 mkm with a high quality output beam. The present laser advice may be utilized in scientific, commercial, aerospace and free space applications.

71 Claims, 18 Drawing Sheets

U.S. PATENT DOCUMENTS

| | | |
|---|---|---|
| 4,937,834 | 6/1990 | Egawa . |
| 4,964,136 | 10/1990 | Egawa . |
| 4,972,427 * | 11/1990 | Streifer ................................. 372/92 |
| 4,974,229 | 11/1990 | Egawa . |
| 5,008,894 | 4/1991 | Laakmann . |
| 5,038,357 | 8/1991 | Lavarini et al. . |
| 5,067,135 | 11/1991 | Perzi et al. . |
| 5,091,914 | 2/1992 | Maeda et al. . |
| 5,153,892 | 10/1992 | Kawakuba et al. . |
| 5,200,971 | 4/1993 | Wildermuth et al. . |
| 5,206,875 * | 4/1993 | Von Buelow ........................ 372/90 |
| 5,313,486 | 5/1994 | Nakstain . |
| 5,682,400 * | 10/1997 | Krasnov ............................... 372/82 |
| 6,005,349 * | 12/1999 | Kunhardt ....................... 315/111.21 |

* cited by examiner

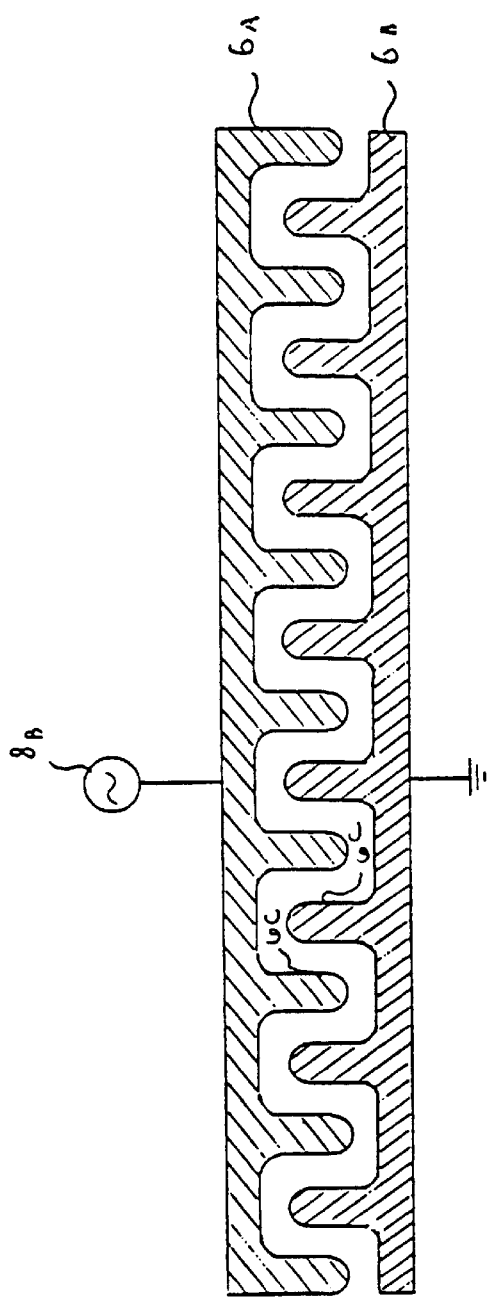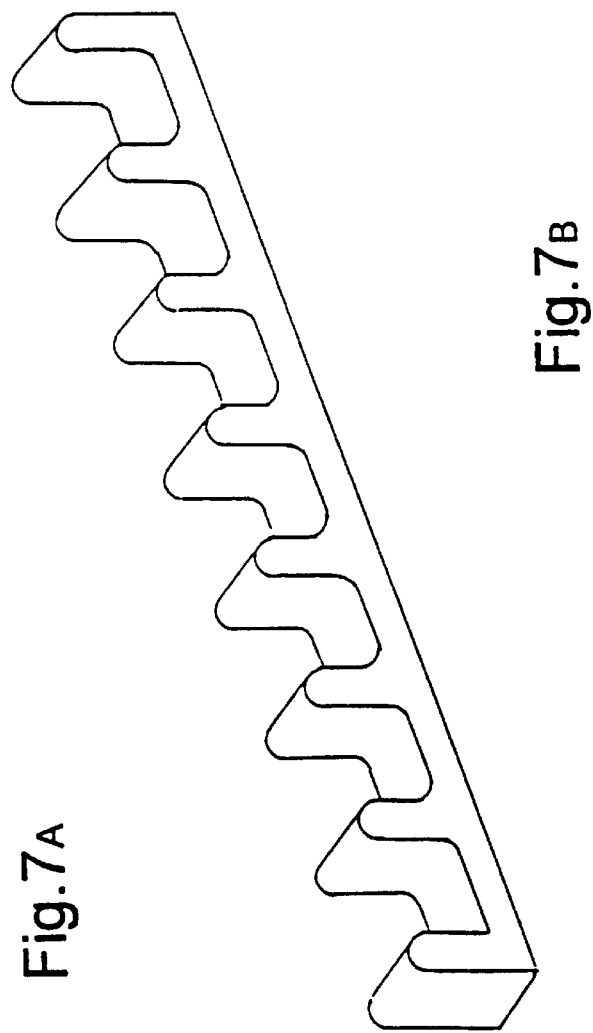
Fig.7A
Fig.7B

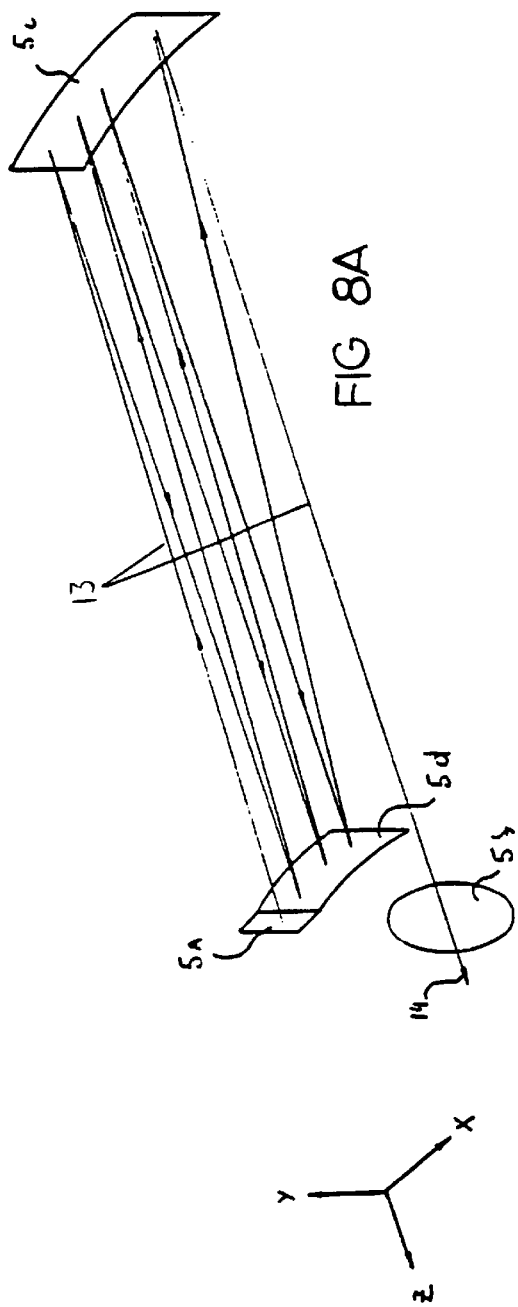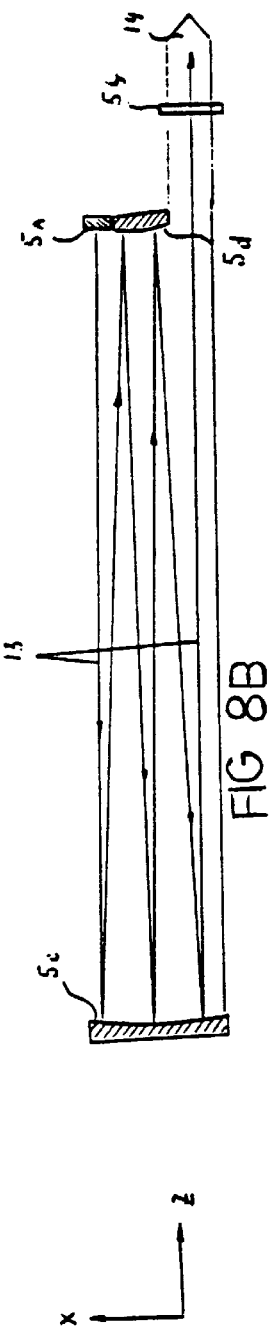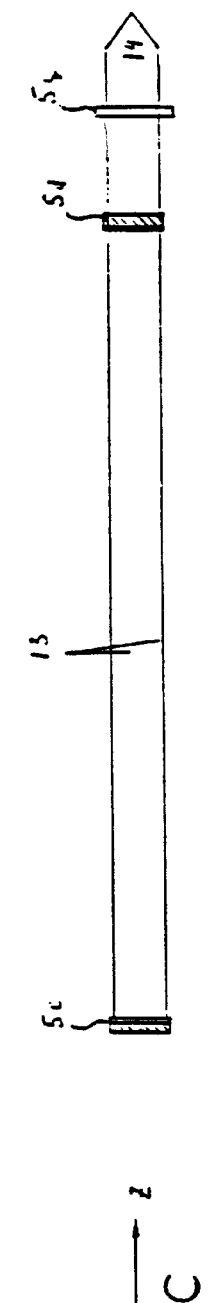
FIG 8A
FIG 8B
Fig.8C

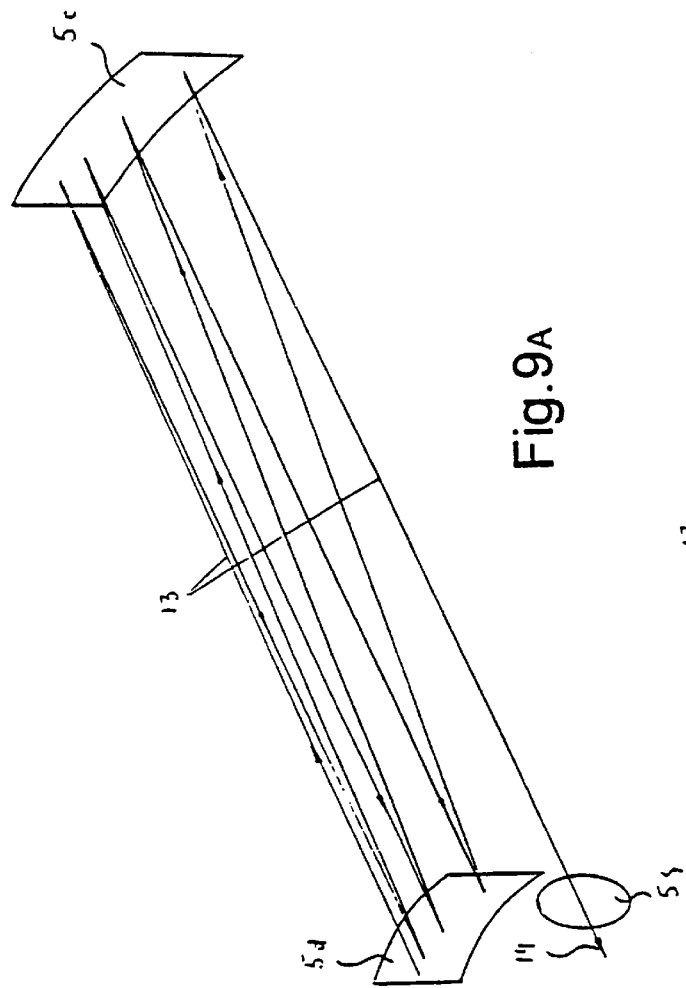
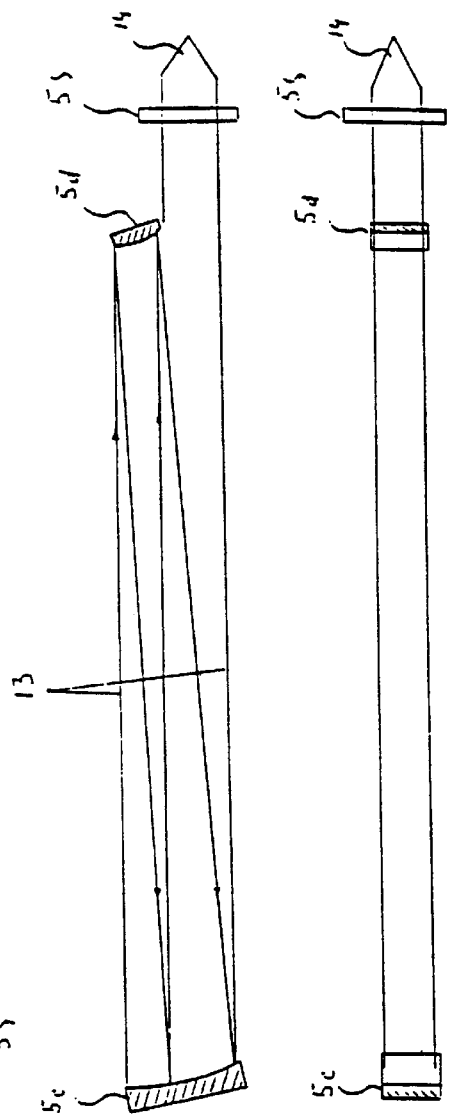
Fig.9A
Fig.9B
Fig.9C

SUPERSONIC AND SUBSONIC LASER WITH RF DISCHARGE EXCITATION

The present application claims priority from international application PCT/US96/15400 filed Sep. 26, 1996 which claims priority to U.S. application Ser. No. 08/534,796 filed Sep. 27, 1995 now U.S. Pat. No. 5,682,400.

TECHNICAL FIELD

The present invention relates to supersonic and subsonic lasers which have a gaseous active medium, a nozzle, an RF discharge region, a laser active region, an optical resonator and a diffuser in order to produce a small, lightweight and closed gas system which is lightweight and very efficient. The laser of the present invention uses radio frequency (RF) excitation to generate a non-equilibrium plasma in the area of the sonic/subsonic or supersonic/subsonic gas flow. The high frequency discharge excitation may occur within the critical area of the supersonic nozzle or downstream from the critical area and may be enhanced by RF, electrical or UV pre-ionization of the gaseous active medium in the pre-critical area of the supersonic nozzle.

BACKGROUND OF THE INVENTION

Known gas laser systems use electrical discharges between DC or AC electrodes within transfer or axial flows. However, utilization of DC or AC electrodes, within fast subsonic and especially supersonic flows, creates unstable and non-uniform plasma discharges. These non-uniform discharges produce aerodynamic instability of the gas flow. This instability, characterized by wave shocks and turbulence, is proportional to the static pressure of the flow and volume in the discharge region between DC or AC electrodes. These limitations prevent creation of a stable, uniform and continuous plasma. In addition, AC/DC discharges create aerodynamic resistance for gas flows which requires a higher power gas pump. The aerodynamic instability of the supersonic and subsonic flows generated in the known gas lasers produce regions of increased temperature, related to the wave shocks, as well as temperature pulsation's, related to the turbulence. These factors are responsible for reduction of the laser inversion population, efficiency of the laser and optical quality of the flow within the resonator region.

Gas medium excitations utilizing glow DC or AC discharges are also well known. These laser designs, however, have other fundamental problems. The ARC plasma regions or those areas exhibiting sparking instability create a high atomic temperature of the laser gas which is therefore free from laser inversion population required for generating lasing activity and causes a breakdown in optical quality. Additionally, such sparking instability can lead to chemical composition breakdown of the gas active medium. Relative to the RF glow discharges, DC or AC glow discharges have a reduced energy contribution to the same volume of stable non-equilibrium plasma. Typically RF density requirement for excitation has a range from 10 to 100 watt per cubic cm., depending on RF frequency and type of RF plasma (Alpha or Gamma). In the case of DC and AC glow discharges for identical gas conditions the range of maximum possible densities is only from 1 to 5 watt per cub. cm. above which the sparking-plasma instability has taken place.

There is also a principle difference between natures of RF and DC/AC plasma structures. DC or AC discharges are based on the direct current of electrons and ions between an anode and a cathode. RF or High Frequency Discharge excitation is based on the high frequency oscillation of electron's boundaries located on the RF electrodes and stimulation of a "Positive Column" of ions and negative electrons between RF electrodes with the help of high frequency ionization by collision mechanisms. This means that DC and AC discharges are much more capable of the disintegration of chemical stability of the laser gas medium based on the dissociation, for example, of $CO_2$ molecules to molecules of CO and atoms of O. That is why RF discharges are superior to DC/AC type of discharges in the following respects: chemical stability of the laser gas; energy contribution to the volume of plasma; optical quality of the active medium; and level of power of gas pump required for providing gas medium flow.

SUMMARY OF THE INVENTION

The present invention is for a supersonic or subsonic laser having a radio frequency (RF) discharge excitation and utilizing a gaseous flow of active medium. The laser consists of a gas supply line which provides the gaseous medium through a cooling section into a receiver area. The gas may be supplied into the laser at a predefined pressure, depending upon the specific type of gas utilized. The gas passes through the supply line, cooling section and receiver at slow subsonic speeds.

Downstream of the receiver area is located a supersonic nozzle which opens into an optical resonator region and which also contains a localized excitation area. Downstream of the optical resonator region is located a diffuser which causes the deceleration of the supersonic or subsonic gas medium flow across the entire transverse cross-section of the supersonic nozzle. The laser of the present invention has a classic two-dimensional nozzle interior.

The laser device of the present invention provides for a high output power of laser generation and highly efficient use of the gaseous active medium in order to generate an extremely efficient laser while utilizing a simplistic design and relatively low energy supply. The laser can use various gases or mixtures of gases in combination with radio frequency discharge excitation between large square and flat RF electrodes in the area of sonic/subsonic or supersonic/subsonic flow of the gas active medium. The laser of the present invention utilizes a radio frequency (RF) discharge which creates a non-equilibrium "Alpha" or "Gamma" plasma through ionization and electron excitation of high states of atoms, molecules or ions in order to achieve a high inversion population necessary to generate lasing activity in the optical resonator region. The laser can utilize an open or closed loop system, said closed loop system enhanced by the ability of the laser to maintain the circulated gas at a low static temperature.

The laser of the present invention has a high frequency discharge region between wide linear RF electrodes in the area of the sonic/subsonic (M=1/M<1) or supersonic/subsonic (M>1/M<1) flow of the gaseous active medium. Radio frequency (RF) discharge creates a near uniform distribution of ions and electrons between plane electrodes. The radio frequency discharge region is located between RF electrodes and can be located within the critical area of the supersonic nozzle or downstream of the critical area within the supersonic area of the nozzle. The excitation region of the laser may have a more extensive area relative to the discharge region, depending upon the active medium or the pressure of the gas and may occur within the critical and supersonic areas of the nozzle up to the beginning of the optical resonator area. Alternatively, the location of RF electrodes and discharge region can be coextensive with the optical resonator region.

Within the optical resonator region is located the laser active region. This region is traversed by the resonator beam phases thereby taking advantage of the maximum level of laser inverse (inversion population) present and generating resonance photon amplification. The lasers generated by Radio Frequency excitation of the present invention are within the wavelength range from 2.03 mkm to 10.6 mkm.

Additionally, pre-ionization of the gaseous medium may take place in the pre-nozzle receiver area or within the critical area of the nozzle in order to aid in the creation of high frequency plasma required for ionization and electron excitation of the gaseous active medium in the excitation region. Such pre-ionization may be generated by a pre-ionization RF grid through which the gaseous medium passes. Alternatively, pre-ionization may be generated using ultraviolet bulbs or other UV sources as RF or AC plasma. The pre-ionization of the gaseous medium may be further enhanced by adding some portion of light ionization gas or vapor to the gaseous active medium.

Located downstream and at the end of the receiver area is a supersonic nozzle. The two-dimensional supersonic nozzle has an optimal logarithmic profile to insure a quiet supersonic/subsonic flow having a uniform transverse distribution of thermodynamic parameters allowing for the adiabatic expansion of the gases within the nozzle. The supersonic nozzle opens into and within the optical resonator region and has a small opening angle to insure parallel supersonic/subsonic flow within the supersonic area of the nozzle. The supersonic area of the nozzle occurs in the interval between the critical section of the nozzle and the downstream diffuser.

The laser head can be integrated with two cooling sections for providing cooling of the laser gas flow at two locations, upstream of the receiver and downstream of the diffuser. The laser head also can be integrated with RF resonator and RF power amplifier.

Overall, the laser of the present invention is small, lightweight, exceptionally powerful and efficient and may utilize a closed loop gas medium system by taking advantage of the lack of chemical degradation of the gas medium by combining the high speeds and constant low temperature throughout the interior of the laser body.

Finally, the present invention comprises a radio frequency (RF) discharge laser comprising: (a) an inlet receiver in flow communication with said inlet cooling section; (b) a gas medium entering said inlet receiver through said inlet cooling section and passing longitudinally through said laser; (c) a pre-ionizer in flow communication and downstream of said inlet cooling section; (d) a supersonic nozzle in flow communication and downstream of said inlet receiver; (e) a first and a second RF electrode placed on opposing sides of said flowing gas medium and in flow communication and downstream of said inlet receiver; (f) a first and a second dielectric plate insulating said first and second RF electrode from said gas medium; (g) an optical resonator within said supersonic nozzle; (h) a diffuser in flow communication with and downstream of said supersonic nozzle; (i) an outlet receiver in flow communication with and downstream of said diffuser; and, (j) a laser beam penetrating said optical resonator.

BRIEF DESCRIPTION OF THE DRAWINGS

A better understanding of the invention will be had upon reference to the following description in conjunction with the accompanying drawings in which like numerals refer to like parts and wherein:

FIG. 7A is a frontal view of a pre-ionization grid;

FIG. 7B is a perspective view of the pre-ionization grid section;

FIG. 8A is a perspective view of the cylindrical telescopical resonator with an additional optical connection;

FIG. 8B is a top view of the resonator of FIG. 8A;

FIG. 8C is a side view of the resonator of FIG. 8A;

FIG. 9A is a perspective view of the cylindrical telescopical resonator;

FIG. 9B is a top view of the resonator of FIG. 9A;

FIG. 9C is a side view of the resonator of FIG. 9A;

DETAILED DESCRIPTION OF THE PREFERRED EMBODIMENT

Figure 1A:
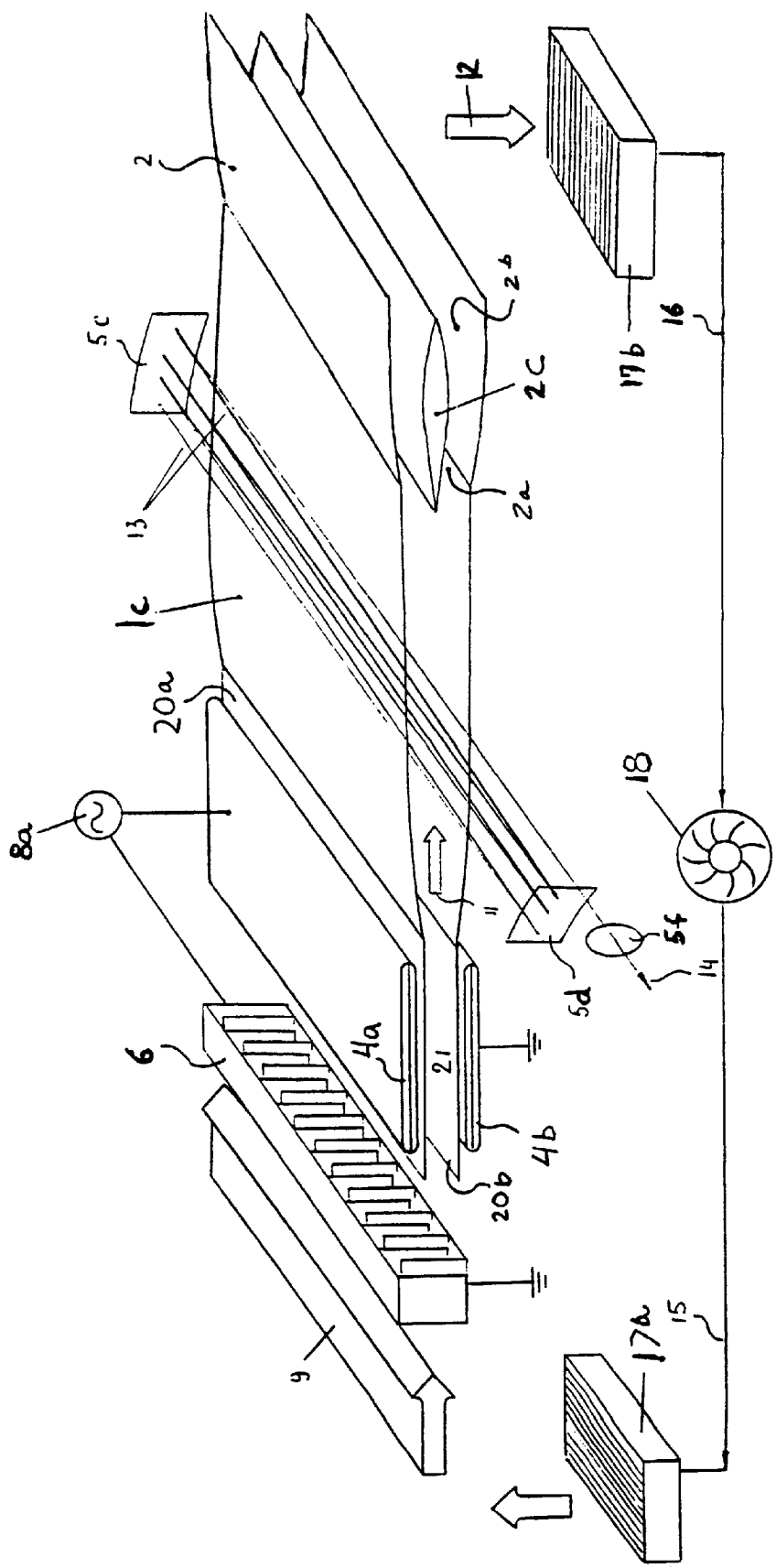
FIG. 1A is a perspective view of a laser of the present invention having a pre-ionization RF solid electrodes-section in the end of the receiver area and having RF discharge excitation in the critical area of the nozzle.

At the outset, the following definitions can be referred to throughout this entire specification. With reference to the supersonic/subsonic nozzle 1, it is often referred to as a "two-dimensional" nozzle. By two-dimensional, it is meant that the profile of the nozzle 1 depends upon two axis, X (length) and Y (height). This nozzle is also called a flat nozzle. The narrowing of the Y axis at 1d of FIG. 5 to create the critical portion 1b of the nozzle causes the adiabatic expansion of the gas flowing therethrough. The coefficient of expansion A within the supersonic nozzle 1 is defined as A=H/h where H is the height of the gas flow within the resonator region and "h" is the distance between dielectric plates 4a,4b. Single mode beam $TEM_{00}$ refers to the lowest order transverse mode with a standard Gaussian curve intensity plot.

Multiple embodiments are provided and described herein. They comprise the embodiments shown in FIGS. 1A–1C, 2A–2C, 3A–3C and 4A–4C. The embodiment of 1A–1C utilizes a pre-ionization grid 6 in the receiver 3a and RF electrodes 4a,4b in the critical area 1b of the supersonic nozzle. The embodiment of FIGS. 2A–2C is similar to that of 1A except the electrodes 4a and 4b are placed after the critical area 1b but before the resonator cavity 23. The embodiment of FIGS. 3A–3C utilizes a pre-ionization grid 6 in the critical area 1b of the supersonic nozzle and places the electrodes 4a,4b within the resonator cavity 23. Finally, the embodiment of FIGS. 4A–4C utilizes a UV bulb 29 for pre-ionization and places the electrodes 4a,4b in the resonator cavity 23.

The laser of the present invention can use the following gaseous active mediums:

a: CO2:N2:He;
b: CO:N2:He;
c: Xe:Ar:He;
d: Xe:Kr:He;
e: He:Ne;

For gaseous mediums "a" and "b", the RF discharge laser uses the molecular transitions based upon ionization and electron excitation of the high vibrational and rotational states of molecules. In this case, the RF discharge laser is molecular and produces laser infrared radiation, on the vibration transitions, with wavelengths of 9.6 mkm to 10.6 mkm for "a" and around 5 mkm for "b". A carbon monoxide molecule is capable also of generation in the area of visible radiation (green light) with an associated wavelength of around 0.5 mkm using electron transitions. For active mediums "c", "d" and "e", the RF discharge laser uses atomic transitions with wavelength generation of 2.03 mkm emission for "c" and a visible laser emission with the wavelength of around 0.63 mkm for "e".

As shown in FIGS. 1A, 2A, 3A and 4A, the active gas medium is introduced into the system by a gas turbine 18 which forces the gas under predetermined pressure into and through the laser interior. The turbine 18 can be integrated with the laser body or can be separate from the laser through utilization of a compact turbostream blower having a power of only about 0.7 kW and which is connected to the laser body by connection hoses. The gas medium typically exhibits a static pressure in the range between 100 and 1000 torr, but may be significantly higher. The gas circulates from the point of introduction into the laser body at the inlet cooling section 17a downstream through receiver 3a, through the nozzle 1, through the diffuser 2, through the outlet receiver 3b, and through an outlet cooling section 17b. A sectional outlay of the above areas is shown in FIG. 5. The gas which passes through the system may be recirculated, as is shown in FIGS. 1A, 2A, 3A and 4A, or may be newly introduced into the laser body at the receiver area 3a from a gas tank (not shown) without use of any cooling sections.

Figure 1B:
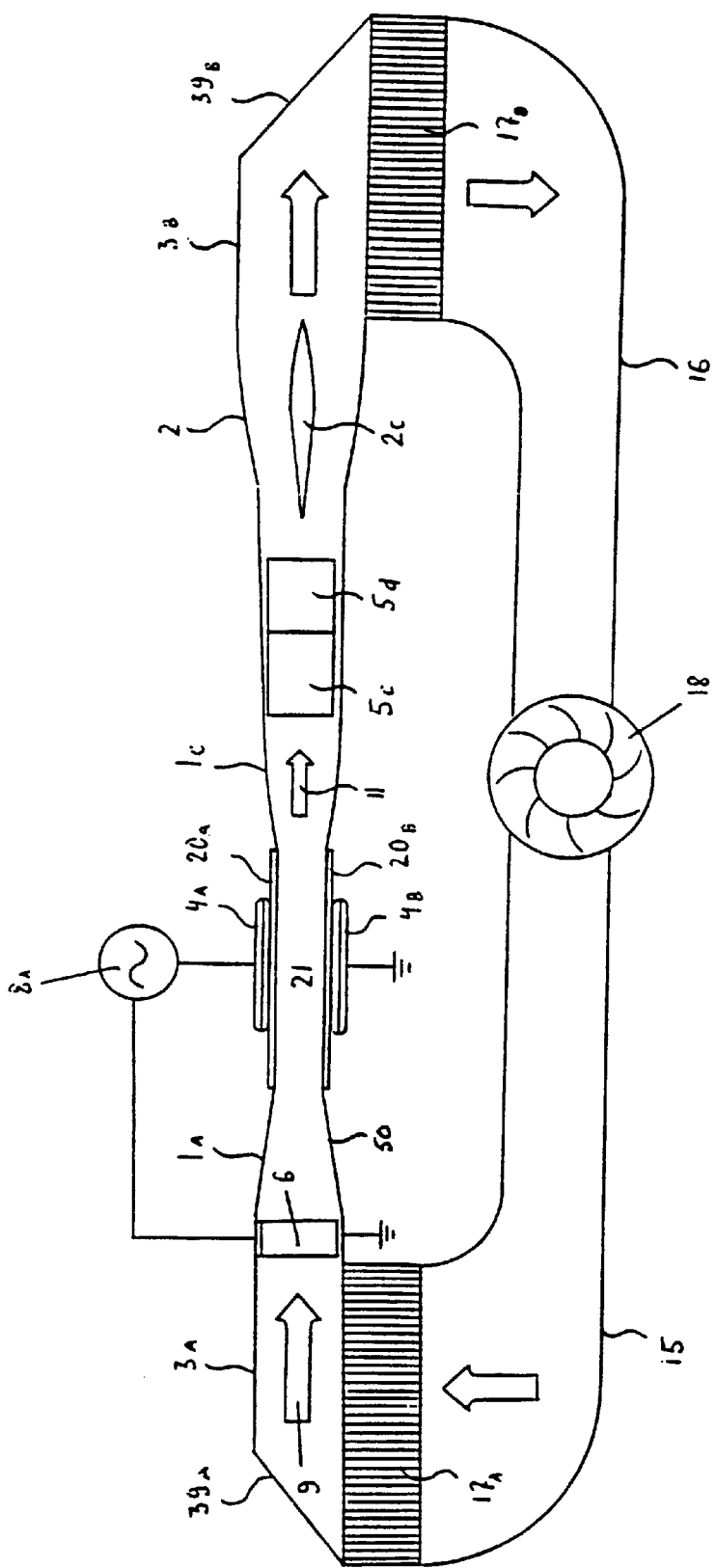
FIG. 1B is a sectional side view of the laser of FIG. 1A.
Figure 1C:
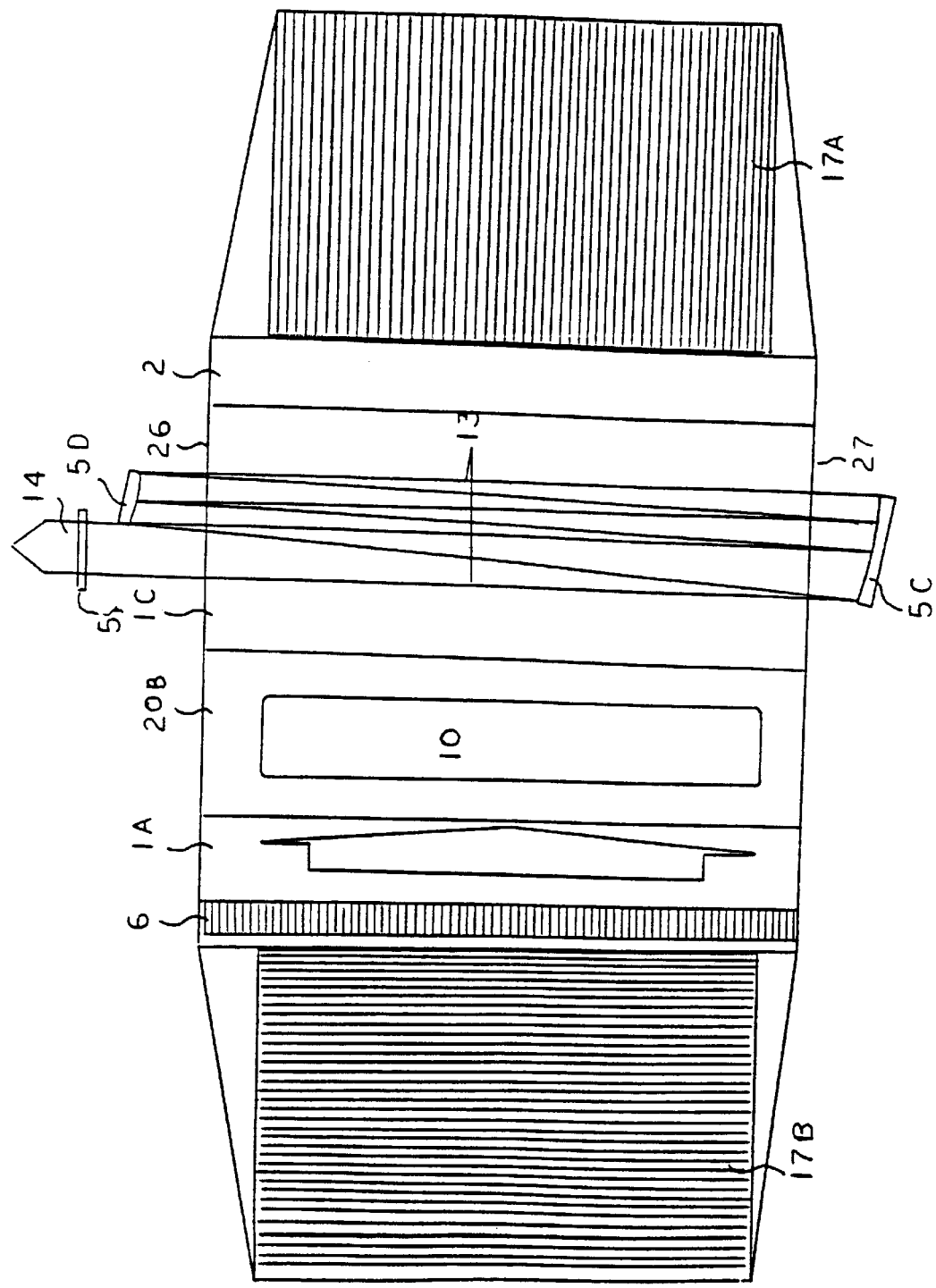
FIG. 1C is a top sectional view of the central portion of the laser of FIG. 1A.
Figure 2A:
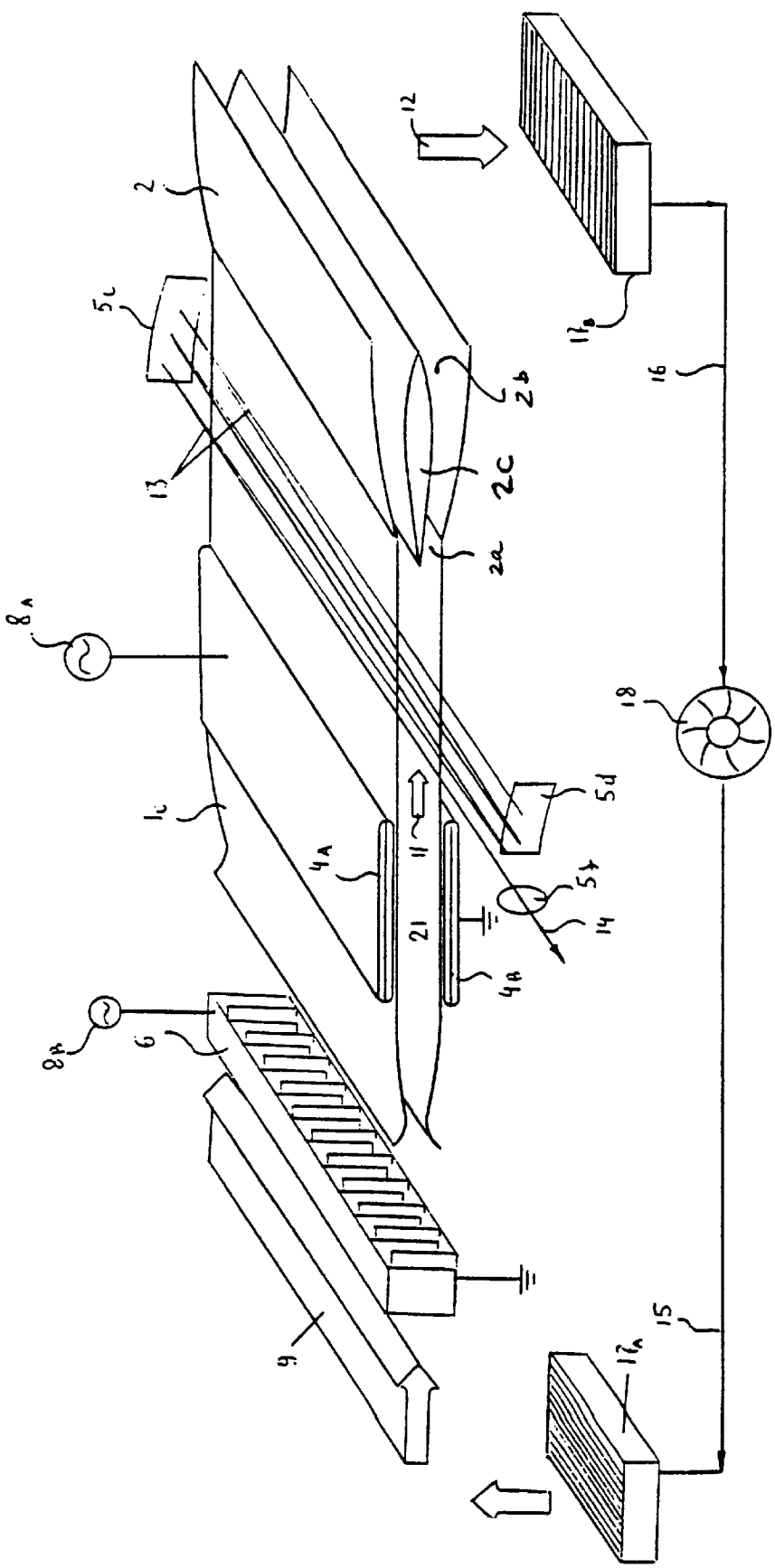
FIG. 2A is a perspective view of a laser of the present invention having a pre-ionization solid RF electrodes-section in the end of receiver area and having RF discharge excitation downstream the critical area of the nozzle and upstream the optical resonator region.
Figure 2B:
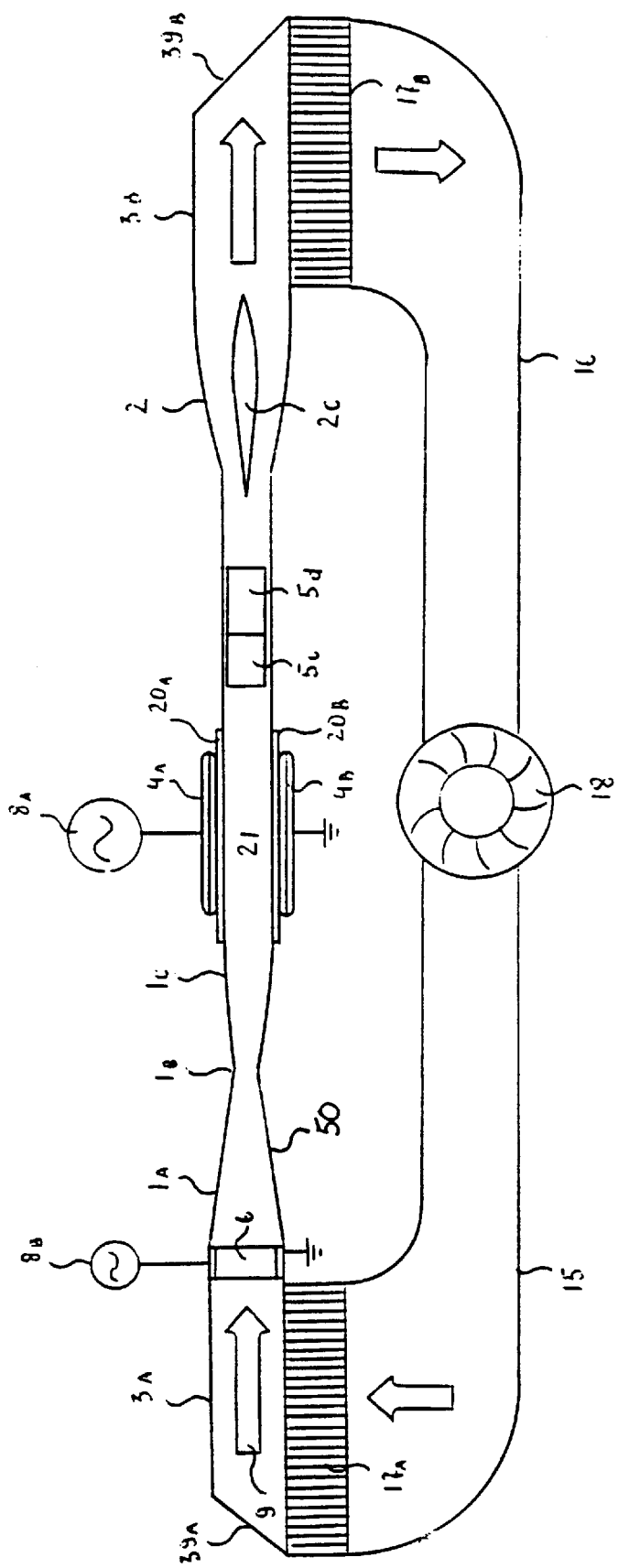
FIG. 2B is a sectional side view of the laser of FIG. 2A.
Figure 2C:
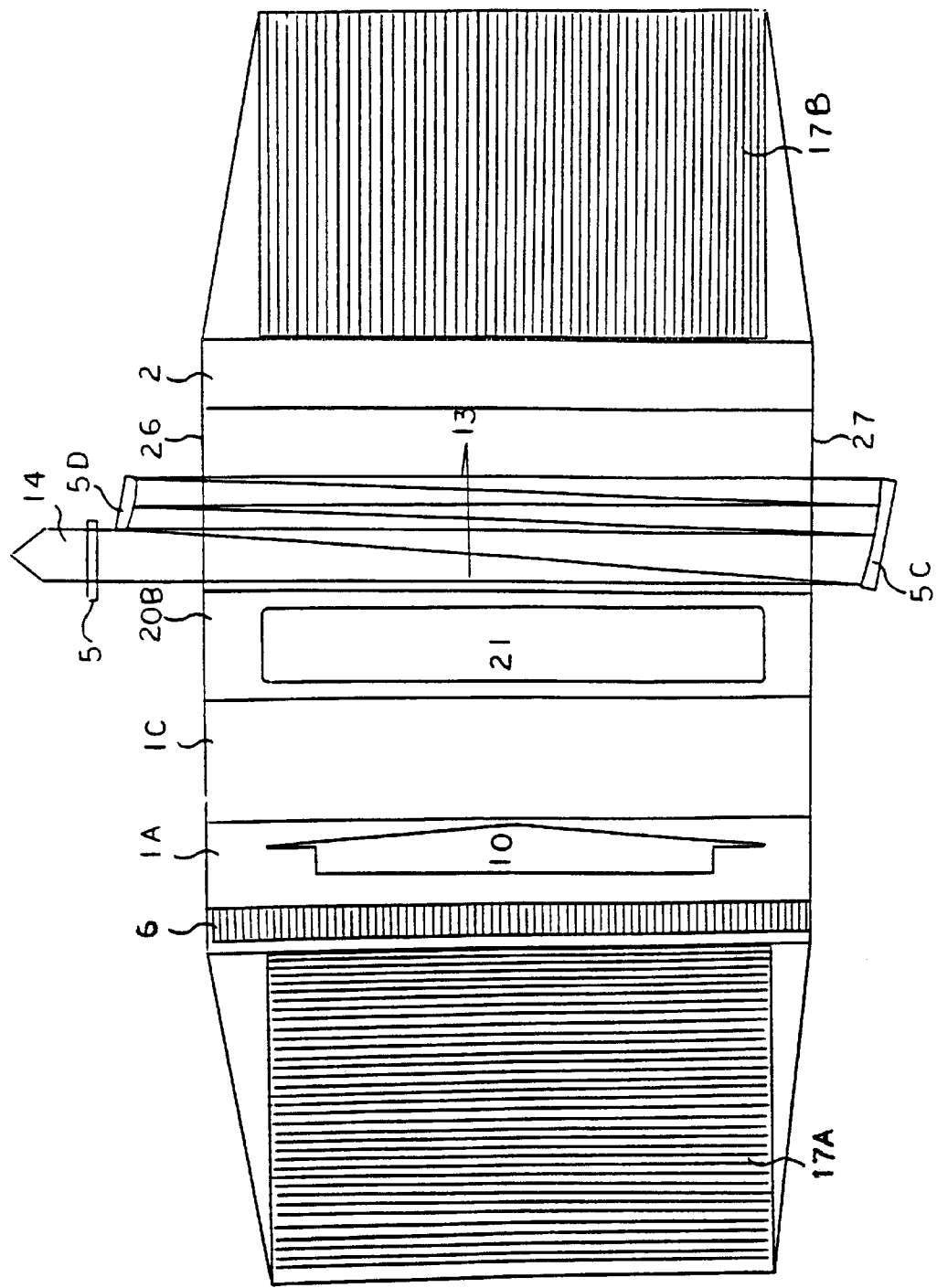
FIG. 2C is a sectional top view of the central portion of the laser of FIG. 2A.

The gas chamber region of the embodiment of the laser shown in FIGS. 1A–1C includes: inlet cooling section 17a; inlet receiver 3a with a 45 degree deflector 39a, shown in FIG. 1B; a pre-ionization grid 6; an upper and lower radio frequency electrode 4a and 4b, respectively; an upper and lower dielectrical plates 20a and 20b, respectively; a discharge region 21 coinciding with the critical area 1b of the supersonic nozzle 1; an excitation region 22 where the inversion population grows; an optical resonator region 23; resonator mirrors 5c, 5f and 5d; a laser active region 24 where the inversion population is maximized; a diffuser 2; outlet receiver 3b with 45 degrees deflector 39b; and, an outlet cooling section 17b.

The inlet to the cooling section 17a is in flow communication with the turbine 18 and supply line 15. The range of static pressure of the gas within the receiver area 3a is generally from about 100 to 1000 torr. The pressure of the gas in the receiver area 3a is dependent upon the type of gaseous active medium used and also upon the gas consumption caused by the lasing activity. This also depends upon output power of the laser emission, the size of the gap between the RF electrodes as well as power and frequency of RF excitation.

Figure 3A:
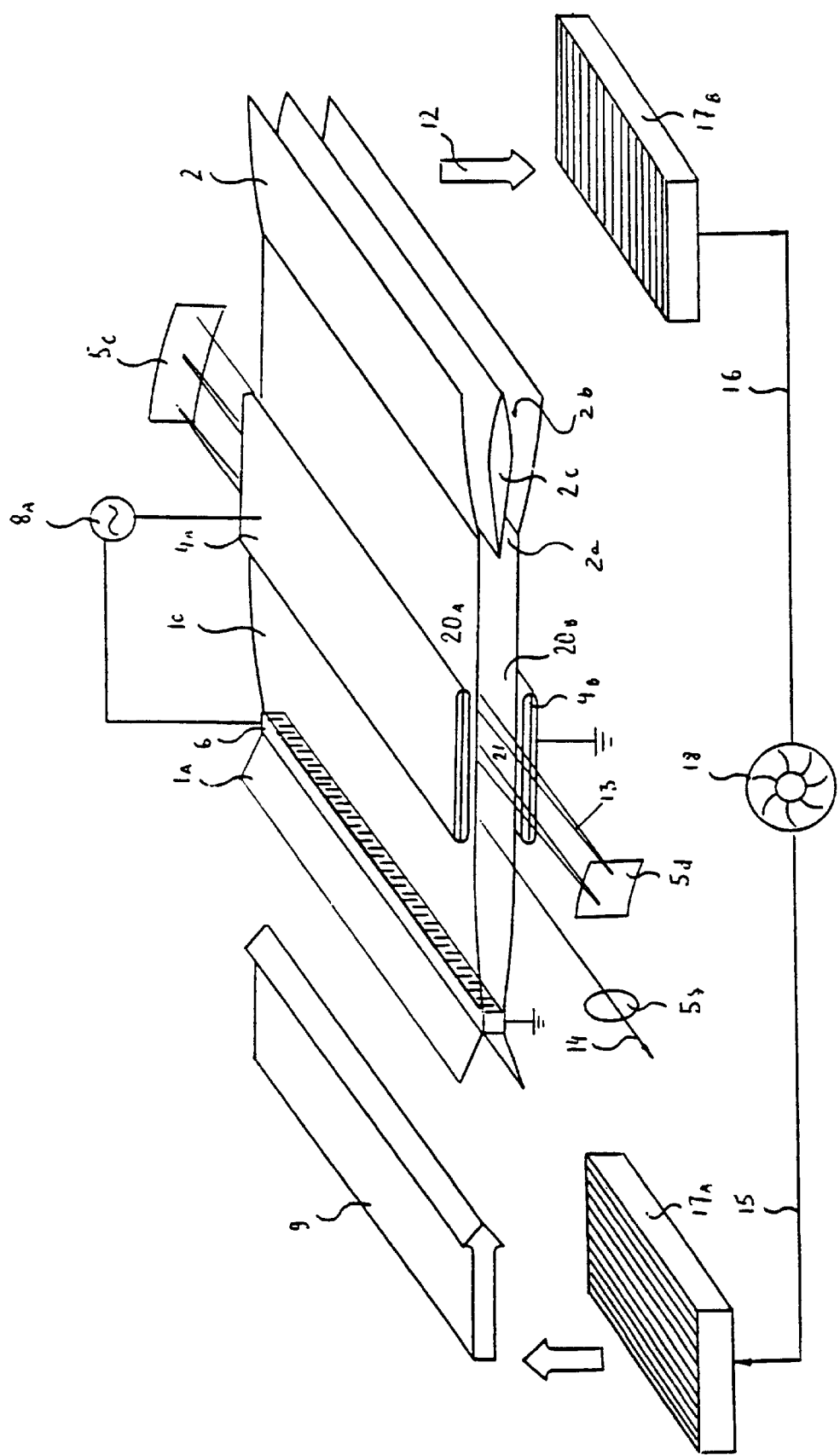
FIG. 3A is a perspective view of a laser of the present invention having a pre-ionization solid RF electrodes-section in the critical area of the nozzle and having a RF discharge excitation area in and coextensive with the optical resonator region.

The additional embodiment laser devices shown in FIGS. 2A and 3A have typical range of speed for gas flow in the optical region of about 0.1M to 5M, where M is a speed of sound. The range of absolute pressure in the receiver area 3a may be typically between 100 torr and 5000 torr. The exact specifications are again dependent upon the gas medium used and required output power of the laser. Utilization of high absolute pressures before the supersonic nozzle 1c allows the laser to operate without an exhaust gas system and emit the gas directly to the atmosphere after the deceleration of the supersonic/subsonic flow in the diffuser 2. Additionally, the ability to combine the excitation region 22, discharge region 21 and resonator region 23 or to precede the optical resonator 23 with the discharge region 22, as shown in FIGS. 2A and 3A respectively, is defined by the speed of gas flow, laser kinetics, type of transitions and speed and life of ionization which is related to the static pressure of the gas flow and other factors.

Figure 4A:
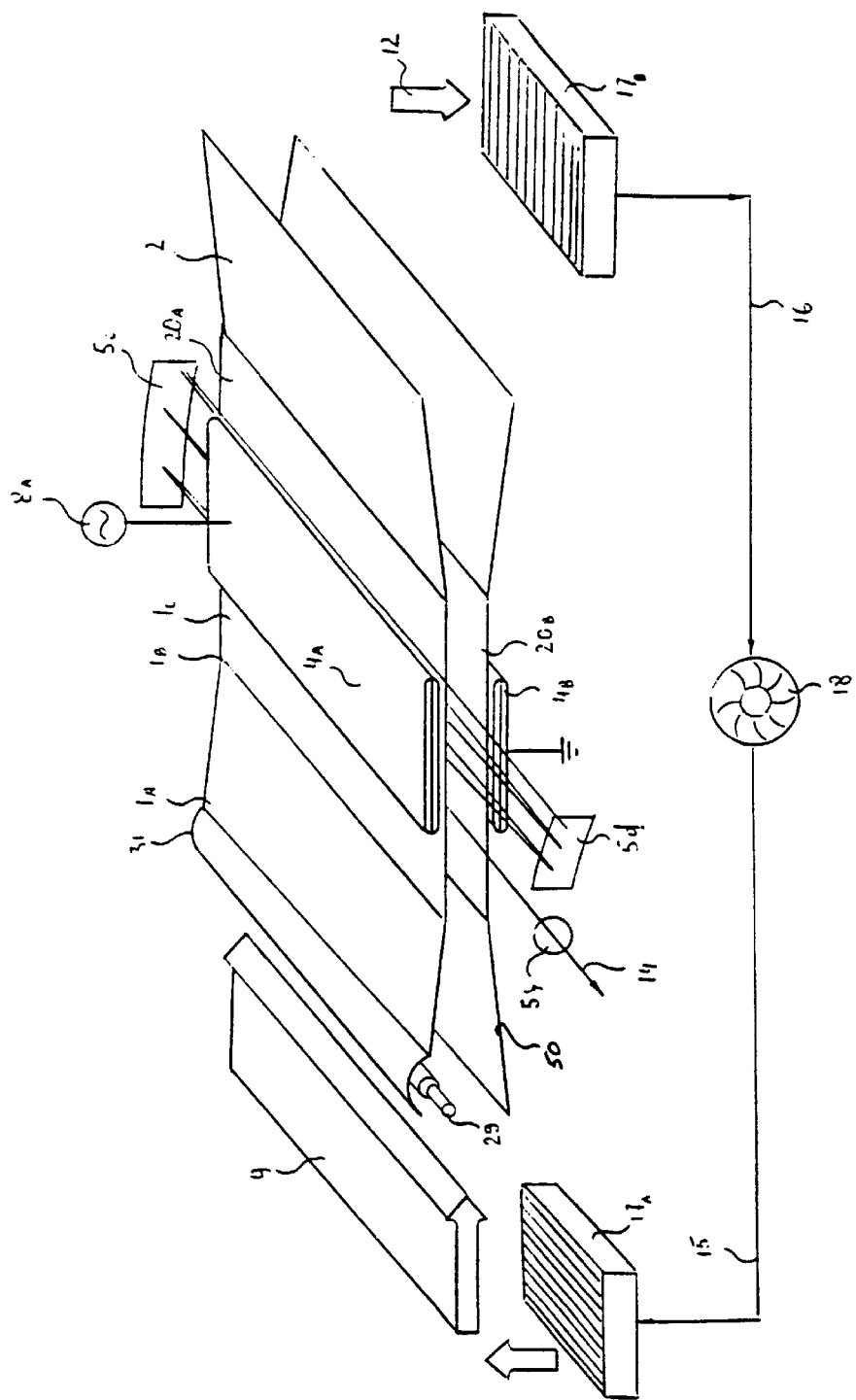
FIG. 4A is a perspective view of a laser of the present invention having a pre-ionization UV bulb in the end of receiver area and having a RF discharge area in and coextensive with the optical resonator region.
Figure 4B:
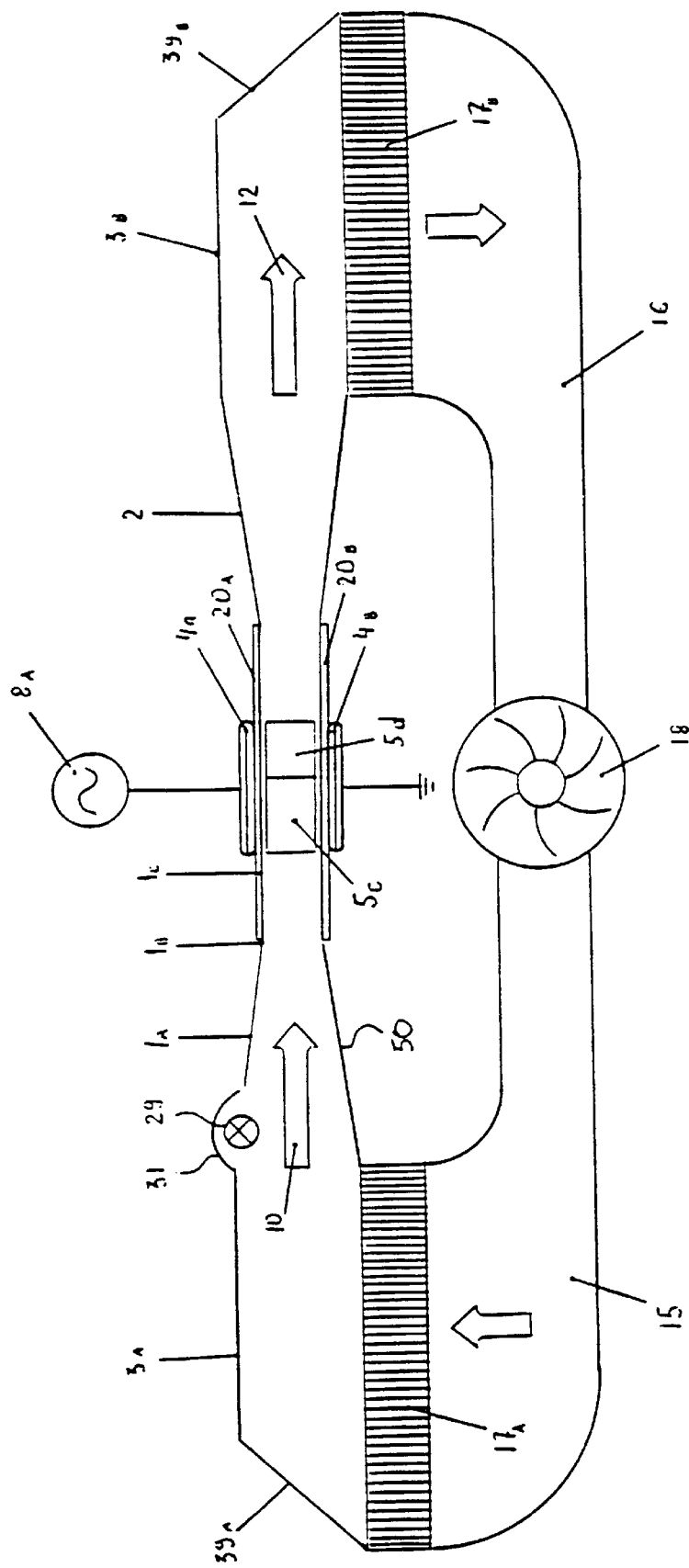
FIG. 4B is a sectional side view of the laser of FIG. 4A.
Figure 4C:
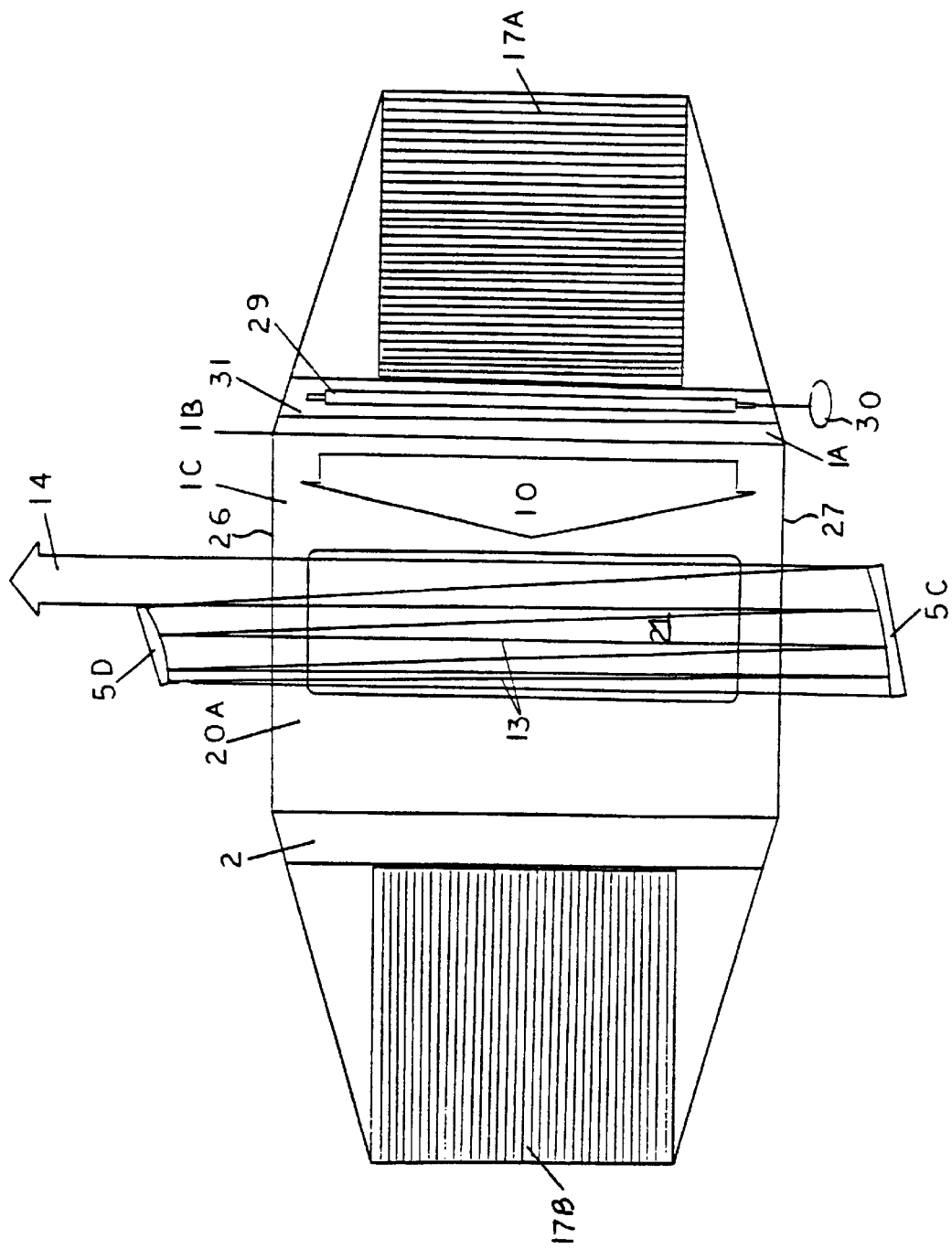
FIG. 4C is a sectional top view of the central portion of the laser of FIG. 4A.
Figure 5:
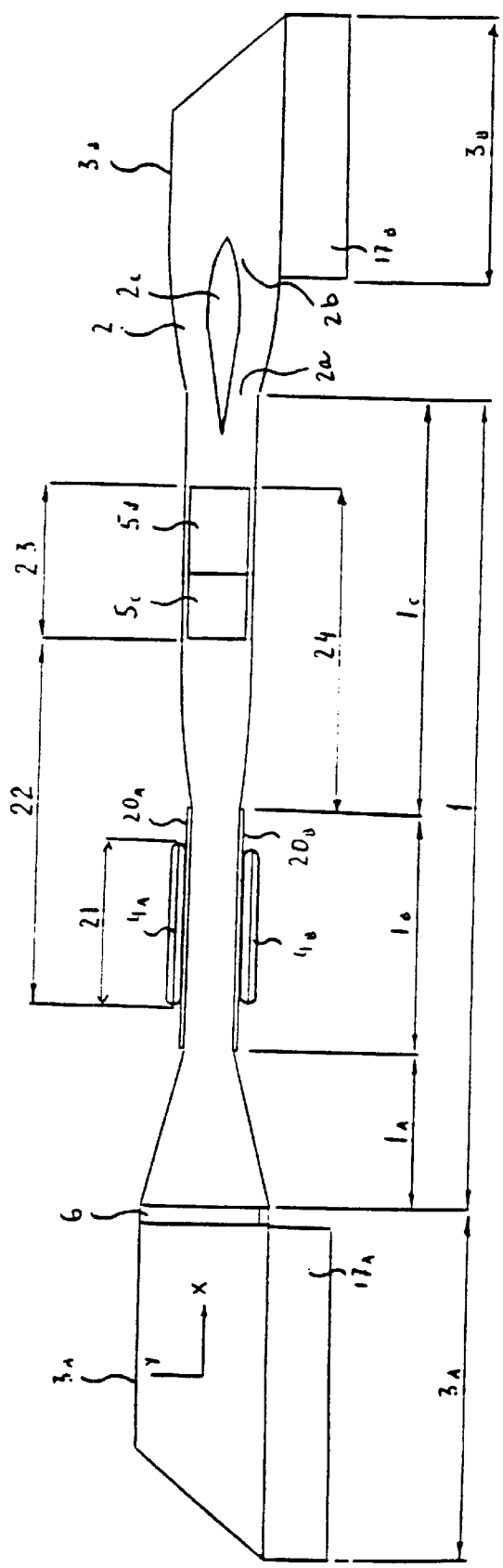
FIG. 5 is a full side schematic view of the laser interior and active gas medium path for the laser of FIG. 1A.
Figure 6A:
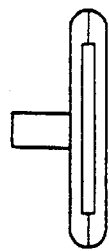
FIG. 6A is a side view of the RF plane electrode.
Figure 6B:
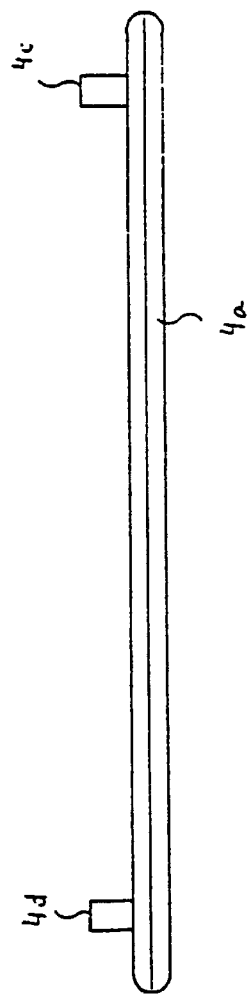
FIG. 6B is a front view of the RF plane electrode.
Figure 6C:
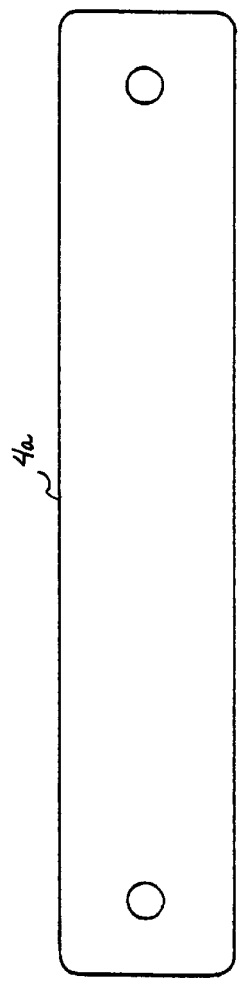
FIG. 6C is a bottom view of the RF plane electrode.
Figure 6D:
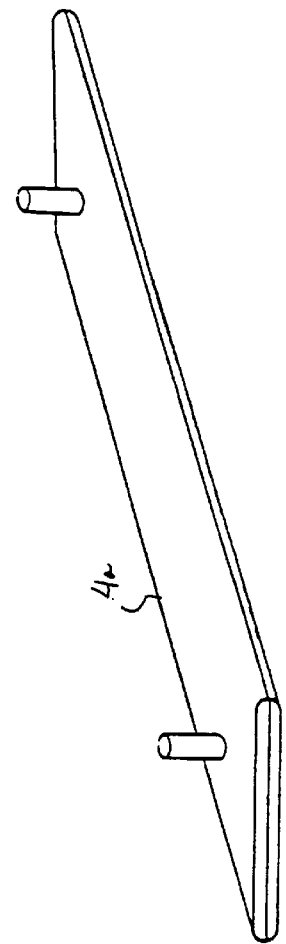
FIG. 6D is a perspective view of the RF plane electrode.

In the embodiment shown in FIG. 4, the laser can have typical range of speed for gas flow in the optical resonator region 23 of about 0.1M to 1M. The range of absolute pressure of the laser gas in the receiver area 3a may be typically between 50 torr and 200 torr. As shown in FIG. 4C the optical resonator 23 is coextensive with the RF discharge region 21. The mirrors 5c,5d resonate laser beam phases 13 perpendicular to the gas flow 10 taking advantage of the inversion population existent with maximal level in the middle thereby producing photon amplification on the resonance transitions of the laser active medium. One of the mirrors, 5f in FIG. 4A, is made transmissive allowing the laser beam phases to exit through the clear window 5f of the resonator 23 and be used as the output laser beam 14.

Referring back now to FIGS. 1A and 1B located downstream of the receiver area 3a and prior to the supersonic nozzle 1b is a pre-ionization grid 6. Alternatively, pre-ionization may be effected by using an ultraviolet source, such as ultraviolet emission from the RF plasma itself or a UV bulb 29 shown on FIG. 4A and the like. Utilizing pre-ionization before or within the radio frequency discharge region enhances the ignition of the excitation plasma and the utilization of costly high frequency energy within the system. By pre-ionization of the active medium using either an RF grid 6 or UV bulb 29, uniform excitation of the non-equilibrium plasma in the gap between the dielectrical plates 20a and 20b found in the radio frequency discharge region 21 is accomplished.

The pre-ionization grid 6 shown on FIG. 7A consists of two metal solid sections 6a and 6b which have small plane sectors 6C, enlarged here for clarity. The gaps between plane sectors 6c are typically 3–4 mm. Between upper and lower plane sectors 6c, a low current "Alpha" RF plasma is created by RF power source 8b. The metal pre-ionization sectors 6c are comprised of aluminum and protected by a hard coating anodizing skin $AlO_3$. The RF pre-ionization grid 6 is electrically connected to the low power RF source 8b or to the branch of the main RF power supply 8a as shown in FIG. 1B.

As shown in FIGS. 4A,4B and 4C, pre-ionization of the gaseous medium 9 may be accomplished by UV bulb 29 partially surrounded from the top by a reflective cylindrical surface 31. The gas flow 9 from the gas supply line 15 enters the receiver 3a through the cooling section 17a. The gas, contained at a predetermined pressure by turbine 18, passes UV bulb 29 before entering into the excitation region 22 of the RF discharge region 21 between upper and lower plane dielectrics 20a and 20b respectively. UV photo-ionization in the laser of FIG. 4A is located before the critical area 1b of the nozzle 1. FIG. 4A presents a laser with the sonic/subsonic as flow within the RF discharge region 21 between plates 4a and 4b when the coefficient of expansion of the nozzle is A=1.

All laser designs have interior walls 50 which are comprised of an aluminum or aluminum alloy, except for the large dielectrical plates 20a and 20b required for insulation of the RF electrodes 4a and 4b. The aluminum or aluminum alloy skin 50 has an all aerodynamic interior surface of non-conductive skin and has a thickness of around of 0.0025 inches or more. The non-conductive material layered on the aluminum surface may be comprised of $AlO_3$ which can be created by hard coat anodizing. The non-conductive skin also can be created by plating of low phosphorous nickel directly to the interior surface of aluminum parts of the laser 50. The laser body can be also manufactured from the dielectric material like machinable ceramics.

Located downstream of the pre-ionization grid 6 at the end of the receiver area is the two-dimensional supersonic nozzle 1 of FIG. 5. The nozzle 1 is comprised of three parts: subsonic area 1a, critical area 1b and supersonic area 1c. The nozzle 1 is designed to have a minimum length along the gas flow X axis and smooth optimal aerodynamic form to insure a uniform quite supersonic or subsonic flow within the optical resonator region 23. The supersonic area 1c of the nozzle 1 has an optimal logarithmic profile beginning at the critical area of the nozzle and opening into and within the optical resonator region 23. The range of speed of the gas flow in the supersonic area 1c of the nozzle 1 within the resonator region 23 is from subsonic speed 0.1M to supersonic 5M(M=speed of sound) depending upon the active medium used and gradient of static pressure of the gas between subsonic area 1a and supersonic area 1c of the nozzle. The coefficient of expansion of the supersonic nozzle A=H/h may have the range from 1 (as shown on FIG. 4) to 30. The height "h" of the critical section 1b of the nozzle or distance between dielectrical plates, may have range between 4 mm and 40 mm. The height "H" of the gas flow within the resonator region has the range from 4 mm up to 40 mm. The cross-sectional width of the nozzle 1 or receivers 3a, 3b may have a range between 10 and 100 cm. The typical width is about 35 cm. The length, defined by discharge region 21, of the RF electrodes 4a and 4b along the gas flow X axis can be from about 2 cm to about 15 cm. The typical length is about 4 cm.

The supersonic logarithmic profile of the nozzle 1c, beginning at the critical area 1b and extending up to the front of diffuser 2 has a small expanding angle of about 0.5 degrees within the optical resonator region 23, as shown in FIG. 5. The small opening angle formed by the logarithmic profiles of the walls of the nozzle is necessary to compensate for the growing thickness of the boundary viscosity skins on the walls and to ensure a quiet and parallel supersonic or subsonic flow between the critical area of the nozzle 1b and the downstream diffuser 2. The optimal opening angle depends on the speed of the gas medium in the supersonic area 1c, the static pressure of the gas flow and its temperature. The pre-ionized laser gas flow 9 and the post-RF excited gas flow 11 of FIGS. 1A and 2A passing through the critical area of the nozzle 1b and downstream into the optical resonator region 23 where the mirrors 5c,5d are located is a quiet supersonic or subsonic flow substantially free from wave shocks. The gas flow 11 in the resonator region 23 has a uniform transverse distribution of thermodynamic parameters, such as static pressure and speed across its height and width.

The supersonic area 1c of nozzle 1 causes intensive adiabatic expansion of the gaseous active medium resulting in an extremely low static gas temperature of the supersonic gas medium and reduces population of the lower energy states of atoms and molecules of said medium. The range of the static gas temperatures in the supersonic flow within the supersonic area 1c depends on the speed of gas flow (between 0.1M to 5M) and is typically between 50 and 285 degrees Kelvin. For a typical supersonic flow exhibiting a speed of Mach=2, the static temperature is 165 K. This low static temperature of the supersonic flow reduces population of the lower energy states of molecules and creates an increasing laser inverse, coefficient of amplifier of the active medium, output power and overall efficiency of the laser and also aids in the full utilization of non-equilibrium plasma created by radio frequency discharge excitation. Creation of extremely low atomic temperatures resulting from dynamic cooling of the gas flow within the supersonic nozzle 1c enables the laser to produce maximum possible laser energy and efficiency of the laser system. For a $CO_2$ laser, this may reach an efficiency level of up to 20–30%. The efficiency may reach 20% for a CO laser. The low static temperature of the gas medium created by the high speed subsonic or supersonic flow prevents the chemical degradation of molecules and enables continued long term recycling and use of the gas medium in the closed laser system. Additionally, while the plasma discharge area may increase the temperature of the gas medium, because of the speed of the gas flow and the cooling sections 17a,17b, the overall temperature remains relatively low and prevents chemical degradation of the gas medium. This is extremely beneficial since the laser of the present invention can thus utilize a closed gas system recirculating the gas without the requirement of gas medium replenishment.

The output power of the present laser may reach the multi-kilowatts range for said active mediums and may be further increased up to a maximum level which is limited by the maximum possible internal resonator intensity of the laser emission, volume of RF plasma, frequency of RF excitation, the time of generation and the heating of the resonator mirrors. Additionally, the optimal aerodynamic forms of the present laser interior produces quasi-laminar supersonic or subsonic flow within the resonator region 23 when the number of Reynolds (gas dimension less parameter) is below the critical level of Re<100000. This smooth quasi-laminar flow, free from wave shocks and turbulence, produces a high optical quality, as well as the optical quality of the output laser beam.

Dielectrical plates 20a and 20b shown in the embodiments 1A, 2A, 3A and 4A are used for the insulation of metal RF electrodes 4a and 4b from the discharge region 21 and gas flow chamber to avoid direct contact between metal surfaces and the laser gas in the area of plasma activity. The dielectrical insulation of RF electrodes also provide a stabilization of RF discharge keeping the area free from "hot spots" and sparking. The dielectrical insulation plates 20a and 20b are comprised of a machinable non-conductive ceramic, glass or mica.

As shown in FIG. 1B, downstream of the receiver area 3a is the radio frequency discharge region 21 located within the critical area 1b of the supersonic nozzle, said critical area is better displayed in FIG. 5. The radio frequency discharge region 21 is created between two dialectically insulated plane RF electrodes 4a and 4b. The non-equilibrium plasma, created by RF boundary electron oscillation, occupies the area of the sonic/subsonic pre-ionized gas flow, located in this particular embodiment in the critical area 1b of the supersonic nozzle 1 of FIG. 5.

The discharge region 21 shown in FIG. 5, forms the first portion of the excitation region 22, thereby causing the high frequency discharge excitation to occur prior to or coinciding with the optical resonator region 23. The supersonic or subsonic flow of the active laser medium 10 downstream of the critical section 1b passes between the insulated RF electrodes 4a and 4b which are connected to a high frequency power supply 8. The gaseous medium has been pre-ionized by an RF grid 6 or UV bulb 29 in FIG. 4A, which in the embodiment of FIG. 3A can be located within the shortened critical area of the nozzle 1b.

The excitation region 22, in FIG. 5, which includes the discharge region 21 and some distance downstream of the discharge region, is the area where the inversion population grows, defined as optical rise time. This area is located immediately preceding the optical resonator region 23 within which the optical resonator mirrors 5c and 5d shown in FIGS. 1C and 2C, are located. The entire region defined as a portion of supersonic nozzle 1 including a portion of the excitation region 22 and all of the optical resonator region 23 is the laser active region 24. This region is the area where the static temperature of the supersonic flow reaches its minimum level and where maximum photon amplification on resonance transitions takes place. The inversion population required for creation of laser energy reaches a maximum level within the laser active region 24, particularly if the RF electrodes 4a and 4b are located within the critical area of the supersonic nozzle, as shown in FIGS. 1A and 4A.

The dielectrical plates 20a and 20b are used to insulate the metal surfaces of RF electrodes 4a and 4b from contact with the ionized gas flow and for stabilization of RF discharge into the gap 21 in order to increase the maximum possible energy contribution to the plasma of power source 8a. The thickness of the dielectrical plates 20a,20b depends on the type of RF mode and on the dielectrical constant of insulation material. In the case of low current "Alpha" mode the typical thickness of ceramic plates is about 3–15 mm and in the case of a high current "Gamma" mode the thickness has the range from about 0.5 to 2.5 mm. The laser of the present invention utilizes an RF power excitation frequency which is not less than 10 MHz.

Within the critical section 1b of the supersonic nozzle in FIGS. 1A and 4A are located an upper and lower plane RF electrodes 4a and 4b with dielectrical insulation plates 20a and 20b to protect the electrodes from the plasma in the discharge region 21. The electrodes 4a and 4b generate a stable radio frequency discharge for ionization and electron excitation of the pre-ionized gas flow 10. One of the RF electrodes 4a is connected to the coil 32, shown in FIG. 10, which acts as an RF resonator. The second RF electrode 4b is electrically grounded. A radio frequency generator 8 supplies RF energy to the electrode 4a for creation of high frequency plasma in the discharge region 21 in order to further excite the pre-ionized gaseous laser medium 10 and populate the higher energy states of molecules or atoms. This high energy state population creates the proper laser inverse necessary for the lasing activity. The RF plane electrodes 4a and 4b are comprised of silver plated brass or aluminum. The metal RF electrode 4a shown on FIGS. 6A, 6B, 6C and 6D is internal distilled water cooled. Alternatively, the electrodes utilized in the present invention can be divided to produce smaller pairs of electrodes. While preferably the length of electrode area along the gas flow axis is about 4 cm., the upper and lower electrodes 4a,4b can be separated into two pair of electrodes, such as, for example, two pair of electrodes 2 cm. in length (gas flow axis length). This may be required due to the dynamics of the laser embodiment, gas medium used, or other special requirements.

In FIG. 1B, two dielectric plates 20a and 20b cover the perimeters of the upper and lower RF metal electrodes 4a and 4b. The thickness of the dielectric plates 20a,20b should be greater than the gap 21 between the RF electrodes 4a,4b. A wide dielectrical or air insulation of RF electrodes 4a,4b from the laser body 50 is necessary to increase the impedance relative to the metal body 50 and to reduce impedance relative to the discharge gap 21. Typical matching impedance between RF electrodes is about 50 Ohms. The typical distance between RF electrodes 4a,4b and laser body 50 should be at least 5 times larger than the height of the discharge gap 21.

Figure 10:
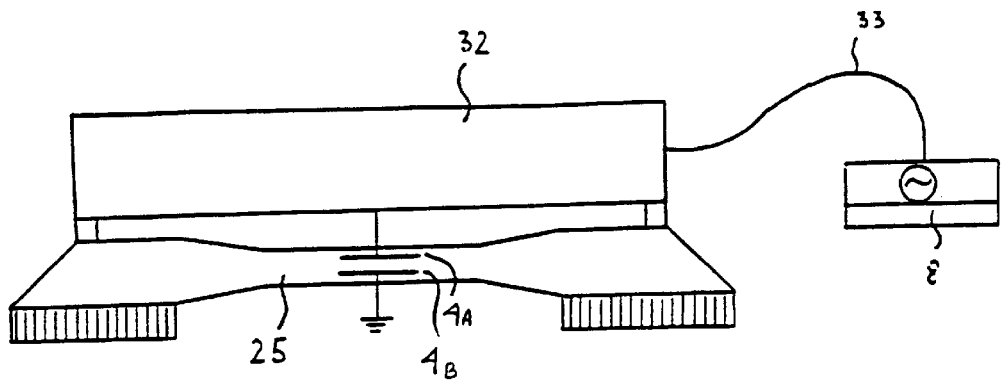
FIG. 10 is a general view of the electrical connections of the RF electrodes of the laser of FIGS. 1,2,3,4, wherein the RF resonator is integrated with the RF electrodes, said resonator connected to an RF power supply; and, FIG. 11 is a general view of RF resonator connection wherein the electrodes of the laser of FIGS. 1,2,3,4 are integrated with RF power amplifier and electrically connected to the DC power supply and controller.

The upper and lower linear electrodes 4a and 4b are oriented perpendicular to the flow 10 of the pre-ionized gaseous medium and are supplied with energy from the radio frequency generator 8. The electrodes 4a and 4b create a high frequency plasma for the excitation of the laser gas within the discharge region 21 as shown in FIG. 5. FIG. 10 shows a general schematic of the RF electrode 4a integrated with an RF resonator 32. There is also shown these sections attached to the RF Power Supply 8 required for generation of radio frequency discharge. The connection between the RF Power Supply 8 and the RF Resonator 32 is completed by an RF Cable 33 which is comprised of a TEFLON® coaxial cable.

Figure 11:
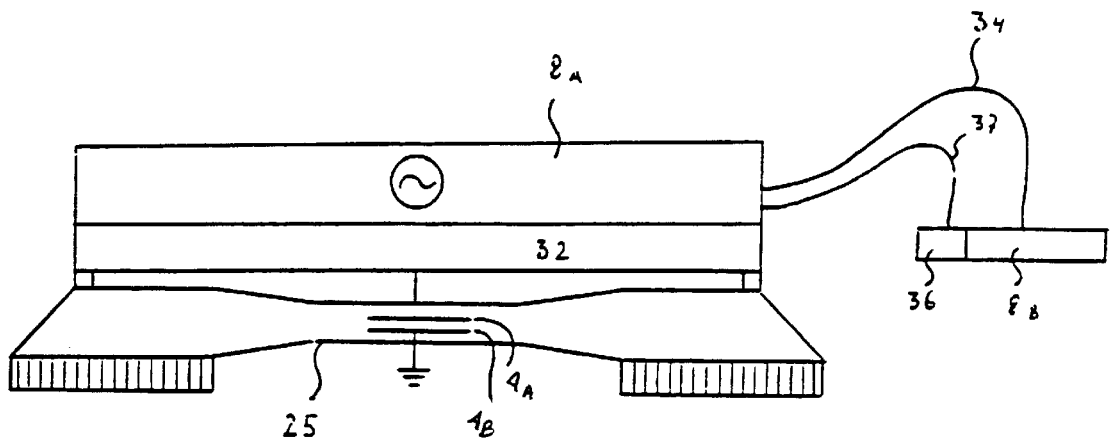

FIG. 11 represent a general view of the laser electrode 4a with an alternative RF power supply 8a and 8b wherein the laser head is integrated with an RF resonator 32 and RF power Amplifier 8a. The integration of the resonator 32 and power amplifier 8a in one unit prevents the requirement, shown in FIG. 10 as element 33, of a thick high power coaxial connection 33 between the power supply 8 and RF resonator 32. In this embodiment, a DC coaxial cable 34 attaches the power supply Section 8b to the RF power amplifier 8a. Power supply section 8b containing the DC power supply, also has the control circuitry 36. The control circuitry 36 is connected to the RF Power Amplifier 8a via low voltage DC coaxial cable 37. The second RF electrode 4b is electrically grounded.

Figure 3B:
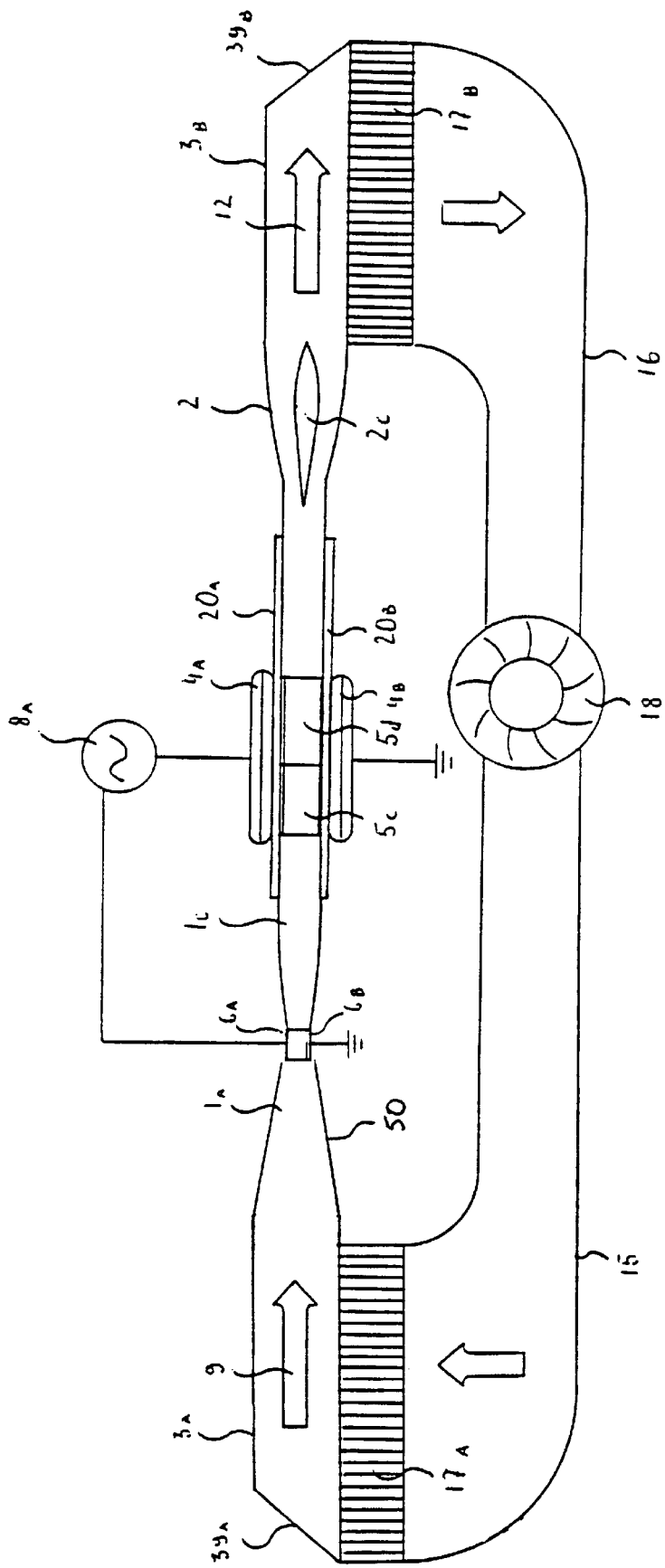
FIG. 3B is a sectional side view of the laser of FIG. 3A.
Figure 3C:
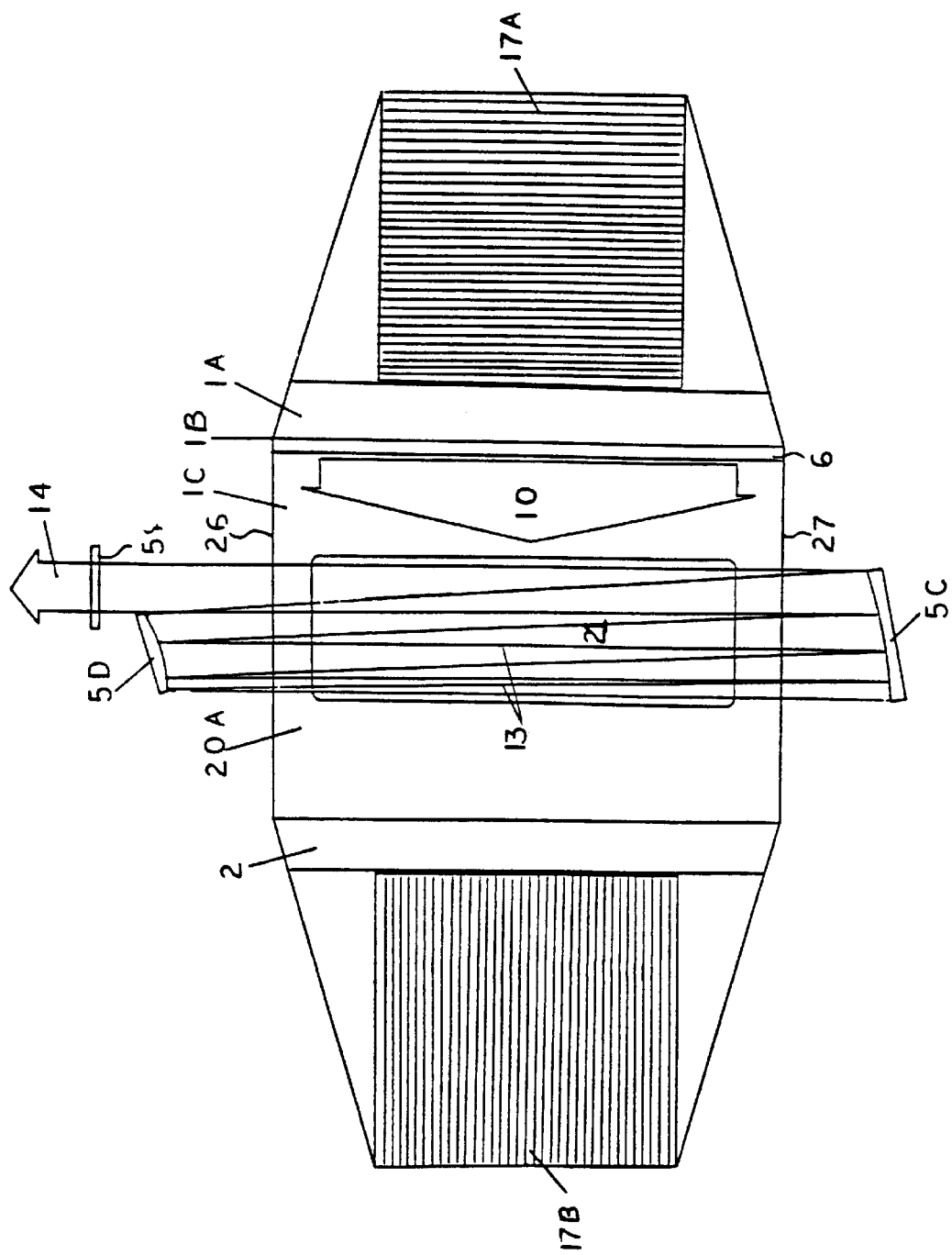
FIG. 3C is a sectional top view of the central portion of the laser of FIG. 3A.

The device shown in FIGS. 3A, 3B and 3C utilizes one upper RF electrode 4a and one lower electrode 4b. Coinciding within the RF discharge region 21 are found a cylindrical telescopical resonator 5c, 5d and 5f where the laser beam phases 13 resonate and become energized utilizing the maximal laser inverse population in the supersonic or subsonic active gas medium 11. The present laser system can utilize an optical cylindrical telescopical resonator shown in FIGS. 9A–9C, or the cylindrical telescopical resonator with an additional optical connection shown on FIGS. 8A–8C. Output mirror 5d is made slightly transmissive, so that output laser beam 14 may exit the optical resonator region 23 and be utilized.

The laser device shown in FIGS. 4A, 4B and 4C is capable of operating with sonic or subsonic speeds of gas flow having a coefficient of expansion of the supersonic nozzle A=1. The discharge region 21, excitation region 22 and optical resonator region 23 are coextensive. Two types of cylindrical telescopical resonators presented above, can be used for providing of single mode beam $TEM_{\infty}$ generation with minimal angle divergence in the output beam. The pre-ionization is provided by the UV bulb 29 as shown in FIG. 4A located close and upstream the nozzle 1. The diffuser 2 in this embodiment is supersonic and can be free from the central element 2c utilized in FIG. 1A.

The laser models presented in FIGS. 2, 3 and 4 can be optimally selected for situations when the active laser mediums have a short time of ionization, excitation and/or short time life of laser inverse population typical for short wavelengths of laser emission. Also, these embodiments may be used if the laser utilizes a high static pressure of the supersonic/subsonic flow within the supersonic area 1c of the nozzle, such as a $CO_2$ laser having a pressure above 100 torr or when the laser operates at subsonic gas flow speeds.

The laser of present invention uses an unstable optical assymetrical cylindrical telescopical resonators as shown in FIGS. 1A, 2A, 3A and 4A and displayed in FIGS. 8A–8C and 9A–9C. The optical resonators represented in this invention may be of two types. The first type is a cylindrical telescopical resonator with an additional optical connection as shown in FIGS. 8A–C. This resonator consists of three optically correlated cylindrical maximum reflective mirrors: one of them is flat 5a, the second is cylindrical concave 5c along the X axis and the third mirror is cylindrical convex 5d along the X axis. All three mirrors are optically correlated to each other for providing amplification of the central single mode beam $TEM_{00}$. The additional optical element 5a allow the unstable resonator to produce a more symmetrical Gaussian distribution of the $TEM_{00}$ mode. The geometric relations of the dimensions of the mirrors and its radiuses follow well known formulas of telescopic mirror utilization. The output laser beam 14 passes through the side of the output mirror 5d and leaves the resonator through the absolute transmissive clear window 5f, which is used for sealing of the laser resonator cavity from the atmosphere.

The second type of the resonator is assymetrical cylindrical telescopical shown in FIGS. 9A–9C, which consists of two telescopically correlated maximum reflective mirrors: one of a cylindrical concave mirror 5c along X axis a cylindrical convex mirror 5d along X axis. The principle of this resonator is similar to the resonator of FIGS. 8A–8C. It is also is capable of providing a high purity laser in the single mode beam $TEM_{00}$.

The advantages of present resonators shown in FIGS. 8A–8C and FIGS. 9A–9C are that the laser beam has a minimal number of phases 13 inside of the resonator. This is an important aspect as to why the output laser beam 14 has minimal optical aberrations. This resonator also only utilizes amplification of the single central mode beam $TEM_{00}$.

An additional advantage of the resonators 23 shown in FIGS. 8A and 9A is that they are technologically simple, easy in corrections and free from the problems related to thermal deformations. This is because power density is uniformly distributed on the large surfaces of resonator's mirrors 5c and 5d. That is why the present optical resonators are able to provide a high optical quality in the single mode beam $TEM_{00}$ of output laser beam. The dimensions of the mirrors are made in accordance to the dimensions of the optical resonator region 23 exhibiting a height of the mirrors Y axis being a little larger than the height of gas flow in the optical resonator region 23.

Downstream of the supersonic nozzle 1 is located the supersonic diffuser 2. As best shown in FIGS. 1B, 2B, 3B, the diffuser 2 consists of two parts: supersonic diffuser 2 and subsonic diffuser 2b. The present diffuser 2 also has a central element 2c, which creates two shock deceleration of the supersonic flow, one within supersonic area 2a and an additional deceleration of the now subsonic flow within the subsonic area 2b.

Exiting the diffuser 2 is the output gas flow 12 through the outlet receiver 3b and cooling section 17b which is captured in the return line 16 and then recycled into the second inlet cooling section 17a, turbine 18 and supply line 15. Cooling section 17a and 17b are standard heat exchangers circulating water therethrough, said water kept at a temperature of around 20° C.

In the embodiment shown in FIGS. 4A–C, downstream of the nozzle 1 is located the subsonic diffuser 2. As best shown in FIG. 4B, the diffuser 2 consists of only subsonic part 2b and is free of the central element 2c. The exit of the diffuser has the same gas communications and flow with the other elements as described in the previous embodiments.

The supersonic and subsonic diffusers have optimal dimensions and form thereby producing efficient use of the absolute pressure present in the gas flow. The typical efficiency of the present two shock diffuser shown in the diagrams (FIGS. 1A–3C) is fairly close to the classical ideal. For a gas speed of about Mach=2, the efficiency is about 90%. This means that wave loss into the present laser system is very low. The viscous loses of kinetic energy within the gas flow depends on the Mach speed and absolute pressure of the gas within the nozzle 1. For a typical gas flow having a speed of about Mach=2 and an absolute pressure located within the receiver 200 torr, the loss of kinetic energy is about 40%. This means that overall loss of kinetic energy within the gas flow in the laser is about 50%. The beneficial result of this design with such a 50% loss in kinetic energy is due to the reduced energy requirements for increasing the pressure of the gas located in the return line for injection back into the receiver 3A. If there is a 50% reduction in kinetic energy, i.e., 100 torr from the absolute pressure required in the receiver 3A of 200 torr, gas turbine 18 requires relatively low energy in order to increase the pressure to 200 torr required within the inlet receiver 3A. Therefore, it is apparent that the power and dimension of the return line turbine 18 is directly related to the diffuser 2 and aerodynamic efficiency of the overall laser device. For a typical $CO_2$ laser with output power of 1.5 kWt the return turbine should have power requirement of only about 2–3 kWt.

For the sonic/subsonic laser device presented in FIG. 4 the typical efficiency of subsonic diffuser 2b is about 95%. This mean that from the position of aerodynamic loss of kinetic energy, use of a subsonic gas flow is more profitable. However, the electro-optical efficiency of the RF excited laser will be less as it is related with a higher temperature of laser gas in the resonator region 23. The overall efficiencies of supersonic and subsonic laser devices using the $CO_2$ version is about 15%.

Utilization of diffuser 2 in the laser of the present invention is not necessary in those situations when the laser operates in a low external pressure environment such as the stratosphere or in freespace. The overall dimensions of the laser of the present invention are exceptionally compact. The lengthwise dimension of the laser head with cooling sections ranges from 30 cm. to 100 cm. without the RF power supply. The width of the laser head is from 30 cm. to 70 cm. with an associated height of between 5 to 20 cm. The weight of the laser can be around 45 kg. The range of output power for the laser of the present invention can be between 1 kW and 20 kW of laser emission, depending on the power required and other implementation specifics.

EXAMPLE 1

A laser was developed using the laser body design in FIG. 4A. The gas utilized was carbon dioxide with a mixture of Nitrogen and Helium. The static pressure of the gas within the laser body is around 90 Torr. The speed of the gas medium is around 0.2M. The dielectric plates have a gap therebetween of around 1.8 cm. with the space between the electrodes of around 2.2 cm. The electrodes generate gamma plasma within the excitation region. The length of the electrodes along the gas flow axis is around 4 cm. The width of the electrodes is around 35 cm. The opening angle of the supersonic area of the nozzle is around 0.5 degrees. The laser utilizes an unstable telescopical cylindrical optical resonator as shown in FIG. 8A. The electrodes emit an average power of 7.5 kW RMS, an RF power excitation frequency of 13.56 MHz with a voltage of around 0.7 kV. Average laser output power is around 1500 W and is also capable of producing pulsing power of up to 3 kW. The impedance found between the RF electrodes is around 50 ohms and the power density per unit volume of plasma is about 35 W and up to 50 W per cubic cm. This density depends on the frequency which in this case is in the 13.5 range. This laser can also utilize other excitation frequencies as required by the particular application, for example 27.12 MHz, 40.68 MHz and 81.36 MHz. In the case of the higher 81.36 frequency, the RF power contribution to the same volume of plasma will be increased by 4.5 times. The output power will be around 5 kW on average while the speed of the gas medium flow should be increased on average 4.5 times also to around 0.9M. For providing a closed cycle gas circulation of the present embodiment, it is possible to utilize a compact turbo stream blower with a power of only about 0.7 kW which is connected to the laser by flexible hoses (thus the turbine is separate and independent of the laser body). This turbine can also be integrated with the laser body thereby slightly increasing the overall dimensions of the laser itself.

The foregoing detailed description is given primarily for clearness of understanding and no unnecessary limitations are to be understood therefrom for modifications will become obvious to those skilled in the art upon reading this disclosure and may be made without departing from the spirit of the invention or the scope of the appended claims.

What is claimed is:

1. A radio frequency (RF) discharge laser comprising:
    (a) an inlet receiver in flow communication with said inlet cooling section;
    (b) a gas medium entering said inlet receiver through said inlet cooling section and passing longitudinally through said laser;
    (c) a pre-ionizer in flow communication and downstream of said inlet cooling section;
    (d) a supersonic nozzle in flow communication and downstream of said inlet receiver;
    (e) a first and a second RF electrode placed on opposing sides of said flowing gas medium and in flow communication and downstream of said inlet receiver;
    (f) a first and a second dielectric plate insulating said first and second RF electrode from said gas medium;
    (g) an optical resonator within said supersonic nozzle;
    (h) a diffuser in flow communication with and downstream of said supersonic nozzle;
    (i) an outlet receiver in flow communication with and downstream of said diffuser; and,
    (j) a laser beam penetrating said optical resonator.

2. The laser of claim 1 wherein said inlet receiver is in flow communication with a turbine.

3. The laser of claim 1 wherein said inlet receiver is in flow communication with a gas tank.

4. The laser of claim 1 wherein said pre-ionizer comprises a metal pre-ionization grid.

5. The laser of claim 4 wherein said pre-ionization grid is connected to an RF power supply.

6. The laser of claim 1 wherein said pre-ionizer is comprised of at least one ultraviolet source.

7. The laser of claim 1 wherein said supersonic nozzle has a logarithmic profile with an opening angle of about 0.5 degrees within said optical resonator.

8. The laser of claim 1 wherein said dielectrical plates have a surface area greater than the surface area of said RF electrodes.

9. The laser of claim 1 wherein said dielectrical plates have thickness of between 0.5 and 3.0 mm.

10. The laser of claim 2 further comprising an inlet cooling section downstream of and in flow communication with said turbine and in flow communication with said inlet receiver.

11. The laser of claim 1 wherein said supersonic nozzle is comprised of a subsonic area, a critical area, and a supersonic area.

12. The laser of claim 11 wherein said electrodes are coextensive with said critical area of said nozzle.

13. The laser of claim 11 wherein said electrodes are coextensive with said supersonic area of said nozzle.

14. The laser of claim 11 wherein the height of said critical area of said supersonic nozzle is from about 4 mm to about 40 mm.

15. The laser of claim 1 wherein said electrodes are coextensive with said optical resonator.

16. The laser of claim 10 further comprising:
    an outlet cooling section adjacent to and in flow communication with said outlet receiver, wherein said gas turbine circulates said gas medium from said outlet cooling section to said inlet cooling section.

17. The laser of claim 1 further comprising an inlet cooling section in flow communication with said inlet receiver.

18. The laser of claim 1 further comprising an outlet cooling section adjacent to and in flow communication with said outlet receiver.

19. The laser of claim 1 further comprising a deflector in said inlet receiver extending at an angle of about 45 degrees.

20. The laser of claim 1 further comprising a deflector in said outlet receiver extending at an angle of about 45 degrees.

21. The laser of claim 1 wherein said gas medium is comprised of at least a portion of carbon dioxide, nitrogen and helium or mixtures thereof.

22. The laser of claim 1 wherein said gas medium is comprised of at least a portion of carbon monoxide, helium, nitrogen or mixtures thereof.

23. The laser of claim 1 wherein said gas medium is comprised of at least a portion of xenon, argon, helium or mixtures thereof.

24. The laser of claim 1 wherein said gas medium is comprised of at least a portion of xenon, krypton, helium or mixtures thereof.

25. The laser of claim 4 wherein said pre-ionization grid is comprised of opposing metal RF electrodes having a plurality of sectors spaced apart a distance of about 3 to 4 mm.

26. The laser of claim 1 wherein said diffuser is further comprised of a central element dividing said gas flow into an upper and a lower exhaust path.

27. The laser of claim 1 wherein said laser has an interior body which is comprised of aluminum.

28. The laser of claim 27 wherein said aluminum interior has a hard coating anodized skin.

29. The laser of claim 1 wherein said RF electrodes are comprised of silver plated brass.

30. The laser of claim 1 wherein said dielectric plates are comprised of machinable non-conductive ceramic.

31. The laser of claim 1 wherein said first RF electrode is in electrical communication with an RF resonator, said RF resonator in electrical communication with an RF power supply.

32. The laser of claim 1 wherein said second RF electrode is electrically grounded.

33. The laser of claim 1 wherein said optical resonator is comprised of an optical cylindrical telescopical resonator.

34. The laser of claim 1 wherein said optical resonator is comprised of an optical cylindrical telescopical resonator with an additional optical connection.

35. The laser of claim 33 wherein said telescopical resonator is further comprised of one concave cylindrical mirror and one convex cylindrical output mirror in optical relationship.

36. The laser of claim 34 wherein said telescopical resonator with an additional optical connection is further comprised of a flat mirror, a concave cylindrical mirror and a convex cylindrical output mirror, all in optical relationship with each other.

37. The laser of claim 35 wherein said concave and convex mirrors have circular profile.

38. The laser of claim 35 wherein said concave and convex mirrors have parabolic profile.

39. The laser of claim 36 wherein said concave and convex mirrors have circular profile.

40. The laser of claim 36 wherein said concave and convex mirrors have parabolic profile.

41. The laser of claim 33 wherein said optical resonator is sealed by an optically transmissive output emission window which said laser beam passes through.

42. The laser of claim 34 wherein said optical resonator is sealed by an optically transmissive output emission window which said laser beam passes through.

43. A radio frequency discharge laser comprising:
  (a) an inlet cooling section;
  (b) an inlet receiver in flow communication with said inlet cooling section and having a deflector angled at about 45 degrees;
  (c) a gas medium entering said receiver through said cooling section and passing longitudinally through said laser;
  (d) a pre-ionizer in flow communication with and downstream of said inlet receiver;
  (e) a supersonic nozzle in flow communication with and downstream of said inlet receiver, said nozzle having a critical area and a supersonic area, said critical area directly adjacent to said inlet receiver;
  (f) a first and a second radio frequency (RF) electrode placed on opposing sides of said flowing gas medium and in flow communication and downstream of said inlet receiver;
  (g) a first and a second dielectric plate insulating said first and second RF electrodes from said gas medium;
  (h) an optical resonator within said supersonic area of said supersonic nozzle;
  (i) a supersonic diffuser in flow communication and downstream of said supersonic nozzle;
  (j) an outlet receiver in flow communication with and downstream of said diffuser and having a 45 degree deflector;
  (k) an outlet cooling section in flow communication with and adjacent to said outlet receiver; and,
  (l) a laser beam penetrating said optical resonator and exiting said laser.

44. The laser of claim 43 wherein said pre-ionizer is comprised of a pre-ionization grid.

45. The laser of claim 44 wherein said pre-ionization grid includes two radio frequency electrodes.

46. The laser of claim 43 wherein said pre-ionizer includes an ultraviolet emission source.

47. The laser of claim 43 wherein said radio frequency electrodes are comprised of spaced opposed plane RF electrodes.

48. The laser of claim 43 wherein said RF electrodes are located within said critical area of said nozzle.

49. The laser of claim 43 wherein said RF electrodes are located within said optical resonator.

50. The laser of claim 43 wherein said RF electrodes are located downstream of said critical area of said nozzle and upstream of said optical resonator.

51. The laser of claim 43 wherein said RF electrodes are water cooled.

52. The laser of claim 46 wherein said ultraviolet emission source is comprised of one ultraviolet bulb.

53. The laser of claim 43 wherein said pre-ionizer is located downstream of said receiver.

54. The laser of claim 43 wherein said pre-ionizer is located within said critical area of said nozzle.

55. The laser of claim 43 wherein said supersonic diffuser has a central element forming an upper exhaust channel and a lower exhaust channel.

56. The laser of claim 43 wherein said first RF electrode is integrated with an RF resonator, said electrode and said resonator electrically connected to an RF power supply by a coaxial RF cable.

57. The laser of claim 43 wherein said first RF electrode is integrated with an RF resonator and an RF power amplifier, said RF power amplifier electrically connected to a DC power supply and power supply controller.

58. The laser of claim 43 wherein said second RF electrode is electrically grounded.

59. The laser of claim 43 wherein said gas medium has a speed from of about 0.1 Mach to about 5 Mach within said optical resonator.

60. The laser of claim 43 wherein the gas pressure within said inlet receiver is from about 50 torr to about 5000 torr.

61. The laser of claim 43 wherein said supersonic nozzle has a coefficient expansion range from 1 to 20.

62. The laser of claim 43 wherein an RF plasma within said RF electrodes is "Alpha" mode.

63. The laser of claim 43 wherein an RF plasma within said RF electrodes is "Gamma" mode.

64. The laser of claim 43 wherein said critical area of said supersonic nozzle has a height of between 4 to 40 mm.

65. The laser of claim 43 wherein said RF electrodes have a gas flow length of about 2 to 15 cm.

66. The laser of claim 43 wherein the interior of said laser is layered with $AlO_3$.

67. The laser of claim 43 wherein the interior of said laser is layered with low phosphorous nickel.

68. The laser of claim 43 wherein the interior of said laser is layered with a non-conductive ceramic.

69. The laser of claim 44 wherein said pre-ionization grid has a plurality of opposing plane sectors which are separated from each other by spacing of about 3 to 4 mm.

70. The laser of claim 43 wherein said first and second electrode are comprised of at least one pair of oppositely spaced electrodes, each of said at least one pair of electrodes placed in opposing relationship around said flowing gas medium.

71. The laser of claim 43 wherein said inlet receiver is in flow communication with a turbine.

* * * * *